(12) United States Patent
Jong et al.

(10) Patent No.: US 9,268,091 B2
(45) Date of Patent: Feb. 23, 2016

(54) METHODS FOR LASER PROCESSING ARRAYED OPTICAL FIBERS ALONG WITH SPLICING CONNECTORS

(75) Inventors: Michael de Jong, Colleyville, TX (US); Radawan Hall, Granite Falls, NC (US); Micah C. Isenhour, Lincolnton, NC (US); Dennis M. Knecht, Hickory, NC (US); James P. Luther, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 1238 days.

(21) Appl. No.: 13/028,799

(22) Filed: Feb. 16, 2011

(65) Prior Publication Data

US 2011/0198324 A1 Aug. 18, 2011

Related U.S. Application Data

(60) Provisional application No. 61/305,733, filed on Feb. 18, 2010.

(51) Int. Cl.
*B23K 26/00* (2014.01)
*G02B 6/255* (2006.01)
*G02B 6/245* (2006.01)
*G02B 6/25* (2006.01)
(Continued)

(52) U.S. Cl.
CPC ............. *G02B 6/2555* (2013.01); *G02B 6/245* (2013.01); *G02B 6/25* (2013.01); *G02B 6/3809* (2013.01); *G02B 6/32* (2013.01); *G02B 6/3825* (2013.01)

(58) Field of Classification Search
CPC ....................................................... B23K 26/00

USPC ............................. 219/121.6, 121.67, 121.72
See application file for complete search history.

(56) References Cited

U.S. PATENT DOCUMENTS 4,350,867 A * 9/1982 Kinoshita et al. ......... 219/121.63
4,874,908 A * 10/1989 Johansson ................... 174/72 A
5,311,410 A * 5/1994 Hsu et al. ...................... 362/552

(Continued)

FOREIGN PATENT DOCUMENTS

CN 1673789 A 9/2005
JP 2000301375 A 10/2000

(Continued)

OTHER PUBLICATIONS

Chinese Search Report, Application No. 2011800073098, Apr. 17, 2014, 2 pages.

(Continued)

*Primary Examiner* — Dana Ross
*Assistant Examiner* — Ayub Maye

(57) ABSTRACT

A method for laser processing arrays of optical fibers and high-fiber count splicing connectors and adapters are disclosed. The method includes the steps of providing a structure having optical fibers arranged in a plurality of rows and placing a protection element adjacent to a first row of optical fibers and a second row of optical fibers. Thereafter, the first row of optical fibers can be processed using the laser. The protection element may also be used to move optical fibers. In one embodiment, the protection element has a first portion and a second portion that have relative movement therebetween. In other variations, an absorption element may be provided adjacent the first row of optical fibers for inhibiting incidental damage to the structure.

22 Claims, 32 Drawing Sheets

(51) Int. Cl.
*G02B 6/38* (2006.01)
*G02B 6/32* (2006.01)

(56) References Cited

U.S. PATENT DOCUMENTS

| | | | | |
|---|---|---|---|---|
| 5,625,737 | A * | 4/1997 | Saito | 385/137 |
| 5,764,823 | A * | 6/1998 | Shapanus et al. | 385/19 |
| 5,915,055 | A * | 6/1999 | Bennett et al. | 385/59 |
| 5,971,624 | A | 10/1999 | Giebel et al. | 385/59 |
| 6,275,642 | B1 * | 8/2001 | Pouyez et al. | 385/137 |
| 6,498,882 | B1 * | 12/2002 | Buckelew et al. | 385/114 |
| 6,773,302 | B2 * | 8/2004 | Gutierrez et al. | 439/541.5 |
| 6,832,032 | B2 * | 12/2004 | Simmons et al. | 385/121 |
| 7,020,359 | B2 * | 3/2006 | Mayer | 385/24 |
| 7,314,317 | B2 * | 1/2008 | Hamasaki et al. | 385/62 |
| 7,712,973 | B2 * | 5/2010 | DiMarco | 385/81 |
| 7,859,757 | B2 * | 12/2010 | Yamamura | 359/621 |
| 2002/0068484 | A1 * | 6/2002 | Gutierrez et al. | 439/620 |
| 2002/0134986 | A1 * | 9/2002 | Kamemura et al. | 257/98 |
| 2003/0031437 | A1 * | 2/2003 | Simmons et al. | 385/121 |
| 2006/0147157 | A1 | 7/2006 | Manning et al. | 385/78 |
| 2009/0097801 | A1 | 4/2009 | Nishimura et al. | 385/78 |
| 2010/0144191 | A1 * | 6/2010 | Machado et al. | 439/490 |

FOREIGN PATENT DOCUMENTS

| | | | | |
|---|---|---|---|---|
| JP | 2005309367 | A * | 11/2005 | G02B 6/24 |
| WO | WO8601306 | A1 | 2/1986 | |

OTHER PUBLICATIONS

European Search Report, Application No. 11705410.6-1504, Nov. 13, 2014, 5 pages.

* cited by examiner

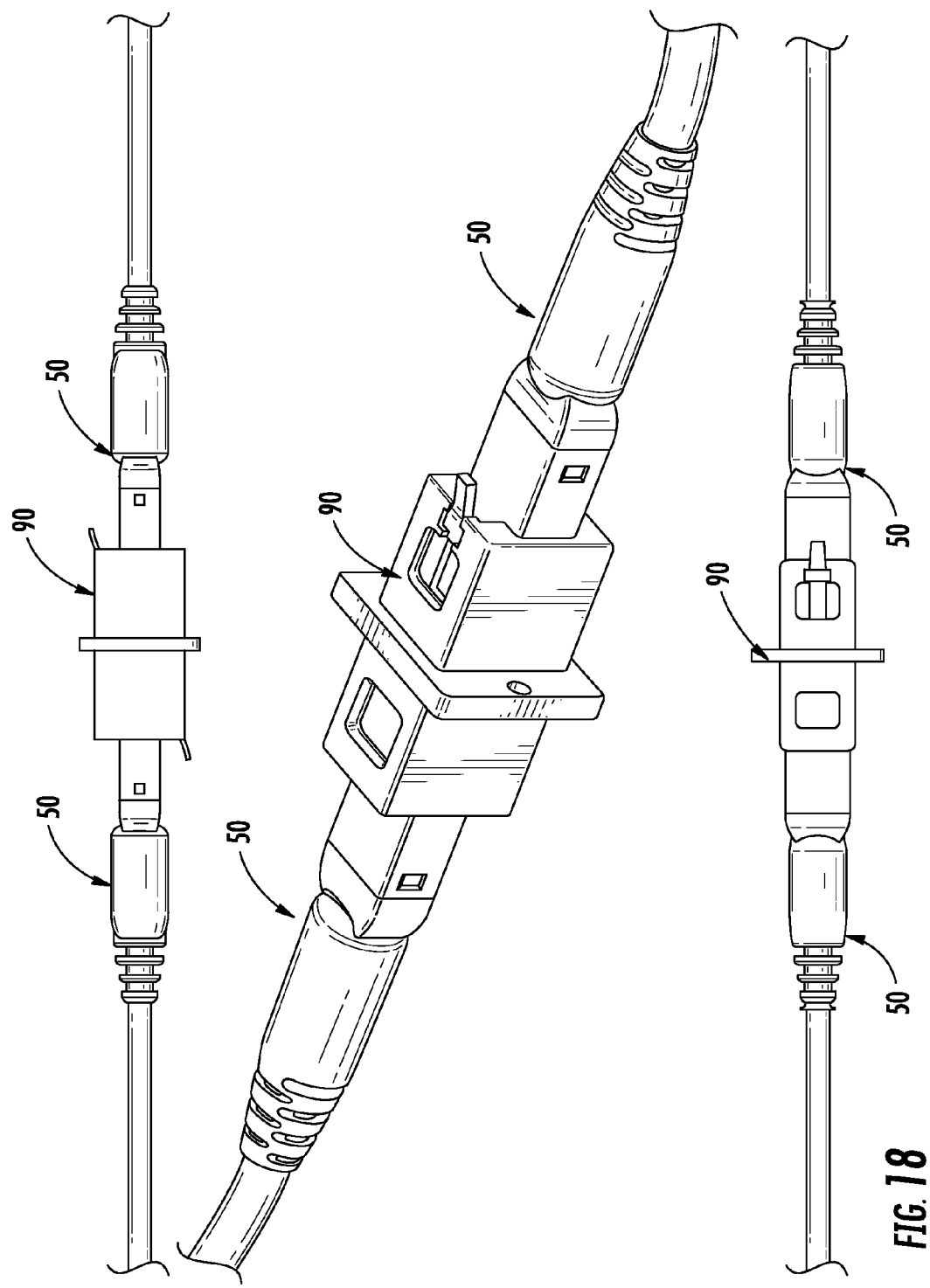

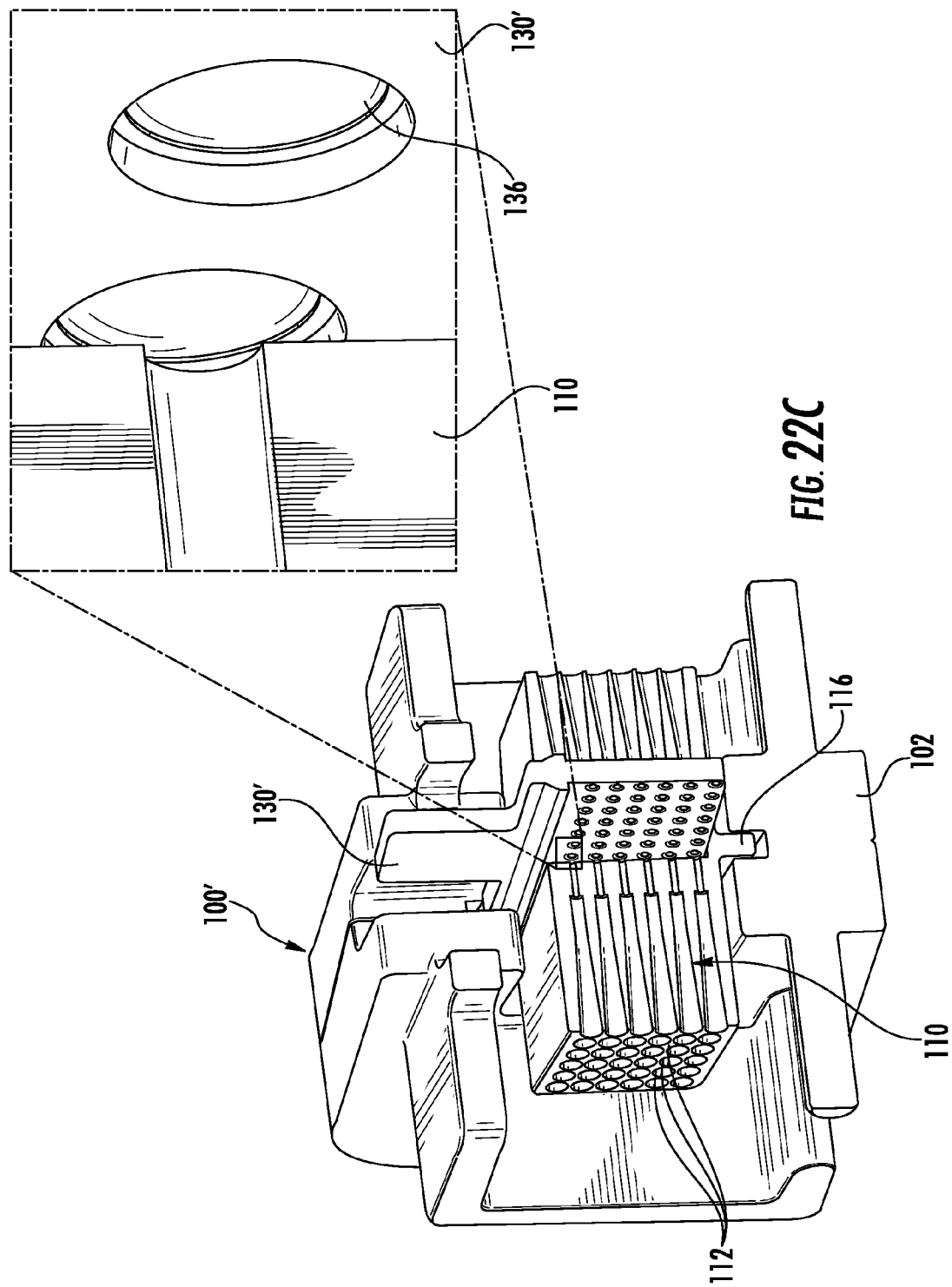

US 9,268,091 B2

METHODS FOR LASER PROCESSING ARRAYED OPTICAL FIBERS ALONG WITH SPLICING CONNECTORS

RELATED APPLICATIONS

This application claims the benefit of U.S. Provisional Application No. 61/305,733 filed on Feb. 18, 2010 and entitled "Methods for Laser Processing Optical Fibers and Splicing Connectors Having a Gel Reservoir," the entire contents of which are hereby incorporated by reference. The present application is also related to U.S. application Ser. No. 13/028,813 filed on Feb. 16, 2011 and entitled "Splicing Connectors Along With Adapters Therefor", the entire contents of which are hereby incorporated by reference.

BACKGROUND

The disclosure is directed to methods for laser processing optical fibers and fiber optic connectors. More specifically, the disclosure is directed to methods for laser processing optical fibers arranged in arrays and splicing connectors having a dense array of optical fibers.

Optical fiber is increasingly being used for a variety of applications, including but not limited to broadband voice, video, and data transmission. As bandwidth demands increase there is an unresolved need for high fiber count fiber optic connectors and methods for making the same. Moreover, the high fiber count fiber optic connectors become increasingly difficult to make as the fiber count increases since the number of fibers that must be aligned increases. In other words, the relatively small cores of the array of optical fibers must be aligned with suitable transmission loss levels for all the fibers of the array.

SUMMARY

The disclosure is directed to methods for laser processing an array of optical fibers. A method for laser processing includes the steps of providing a structure having a plurality of optical fibers arranged in a plurality of rows, inserting a protection element adjacent to the optical fibers, and laser processing the first row of optical fibers. The disclosure is also directed to splicing connectors and adapters that provide optical connection between a plurality of optical fibers.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE FIGURES

FIG. 18 shows various views of a pair of fiber optic splicing connectors having an array of optical fibers mated together using an adapter;

FIGS. 22A-22C are cross-sectional views showing other adapters having lens-based transmission elements;

DETAILED DESCRIPTION OF THE PREFERRED EMBODIMENTS

Figure 1:
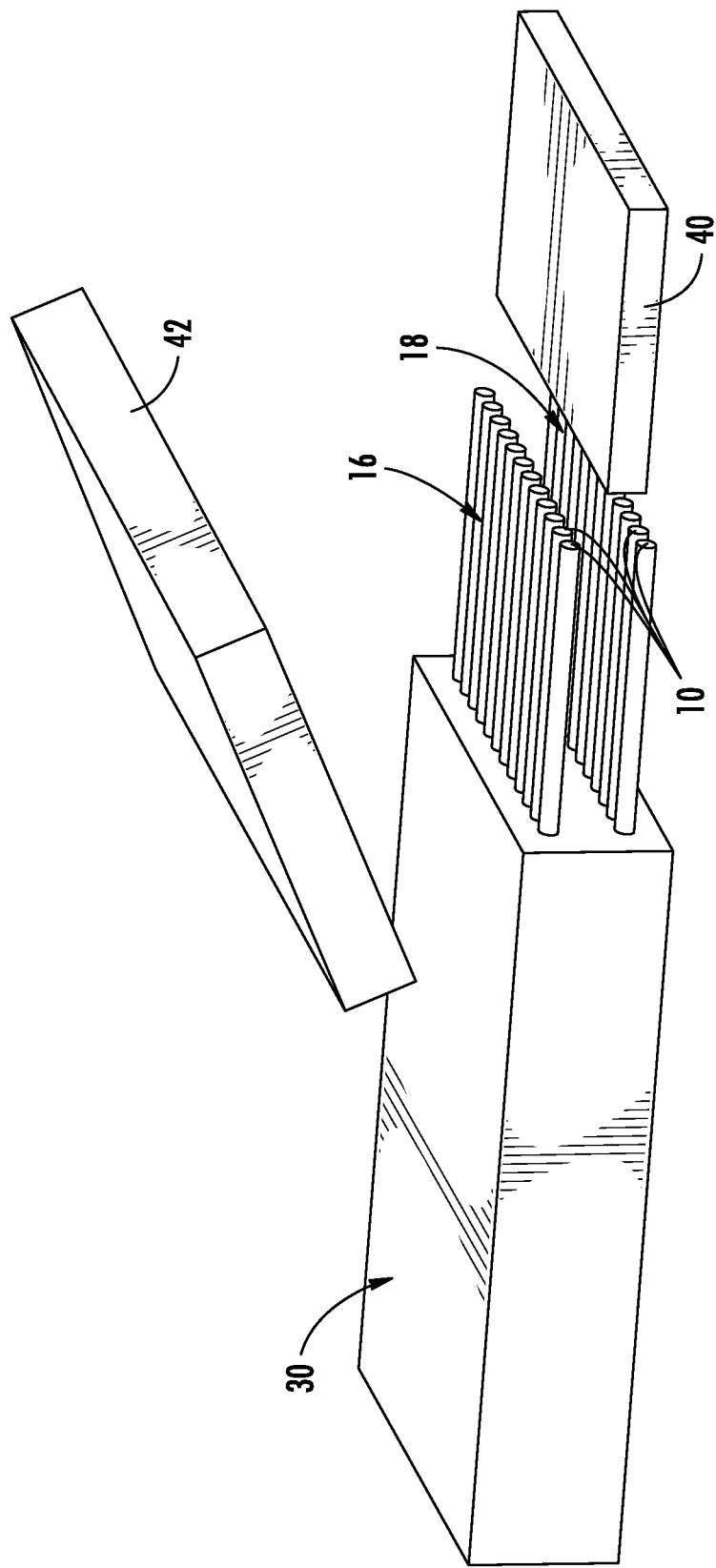
FIGS. 1-6 schematically depict a first method for laser processing a plurality of optical fibers using a protection element disposed between a first row and a second row of optical fibers.

Reference will now be made in detail to the preferred embodiments of the disclosure, examples of which are illustrated in the accompanying drawings. Whenever possible, like reference numbers will be used to refer to like components or parts.

The embodiments and methods described herein are suitable for preparing and/or making optical connections employing a plurality of optical fibers. The concepts of the disclosure advantageously allow the simple, quick, and economical connection between relatively large numbers of optical fibers. Reference will now be made in detail to the preferred embodiments, examples of which are illustrated in the accompanying drawings. Whenever possible, like reference numbers will be used to refer to like components or parts.

FIGS. 1-6 schematically depict a first method for laser processing the ends of a plurality of optical fibers 10 of structure 30 using a protection element 40. Laser processing of optical fibers provides a quick and efficient method for producing a high-quality end face on the optical fiber for termination or the like. Structure 30 may be a fiber optic cable, a ribbon, or other suitable structure having an array of optical fibers known in the art or later developed. By way of example, structure 30 may have multiple ribbons stacked within a cable jacket of the fiber optic cable, thereby defining an array of optical fibers. Other arrangements for the fibers of structure 30 can include one or more groups of loose fibers, loose fibers with ribbonized ends, etc. Although structure 30 shows the array of optical fibers located in linear array other arrangements are possible. Moreover, as used herein "row" means a grouping of optical fibers and is not limited to a linear arrangement. Other structures 30 may have the array of optical fibers included within one or more ribbon matrix materials. The array of optical fibers may be arranged in multiple rows of optical fibers as shown, but the array can have other fiber counts, arrangements, and the like. Additionally, any suitable fiber size, type, and/or spacing arrangement may be used with the concepts disclosed herein for preparing and creating a fiber structure processed using a laser for one or more steps.

By way of explanation, an end of a cable or assembly can be prepared for securing the optical fibers in a suitable structure by first removing a portion of the cable jacket and then grouping or organizing the fibers as desired for insertion into the structure (i.e., fiber organizer). The structure secures the optical fibers at a common location for inhibiting relative movement among the fibers in the array. Moreover, the structure may be used for holding the same in fixturing, thereby providing a convenient and common location for reference. Thereafter, the optical fibers may be processed as desired for connectorization. For instance, the laser may be used for cleaning, removing and/or ablating one or more coatings on the optical fiber, but other types of mechanical processing methods are possible for removing the coating from the fiber. Further, the laser may be used for cleaving and/or shaping the end of the optical fiber as desired, but may also include a mechanical cleaving and/or polish in addition to the laser processing. Thereafter, the laser processed fibers may be used with suitable connectors or assemblies that may or may not use a ferrule for holding the fibers.

More specifically, FIGS. 1-6 depict a first method for laser processing a plurality of optical fibers 10 using a protection element 40. Protection element 40 is used for protecting optical fibers in the array that are not intended for laser processing since they are located at a further distance from the laser than the optical fibers intended for processing. By way of example, structure 30 has optical fibers disposed in a first row 16 a first distance and a second row 18 at a second distance so that the laser could not be focused for both distances. As shown, the first row 16 and second row 18 of optical fibers 10 are schematically shown disposed within a generic structure 30. The protection element 40 can reflect, absorb and/or disperse the laser energy after it passes the optical fibers being processed depending on the type of material used for the same. For instance, if the protection element 40 is a material that has a smooth surface such as a machined aluminum, stainless steel, etc. it will have a high-degree of reflection. On the other hand, if the protection element 40 is formed from a mica, carbon, ceramic plate or other similar porous material it will have a high-degree of absorption. Still further, the degree of dispersion caused by protection element 40 can depend on the surface finish. In other words, the rougher the surface the greater the dispersion. Examples of surface finishes on protection element 40 that can create dispersion are grooves, knurling, etc.

Although protection element 40 is shown having a rectangular shape in the drawings other shapes are possible. By way of example, the protection element 40 may be a square or round disc making it easier to rotate and/or translate the same as part of the laser processing of optical fibers. Simply stated, the protective element 40 may move by being rotated and/or translated to provide a fresh surface thereby providing heat dissipation, a clean surface, and/or allow wiping of glass residue from the protection element 40. Consequently, the life of the protection element is extended by rotating and/or translating the same. Other more sophisticated protection elements are also possible as discussed herein. For instance, the protection element can include a hinged portion having a slot for receiving the current working array of fibers and protecting the array of fibers above and/or below the working array of fibers, thereby making it easier for processing fiber arrays having a relatively small pitch or spacing between fibers.

In this first explanatory method, protection element 40 has a smooth surface that has a relatively high degree of reflection of the laser energy that impinges on the same. Protection element 40 allows the laser energy to reach the optical fibers being processed, but inhibits the laser energy from damaging the optical fibers not being processed, other portions of structure 30, or from creating a safety issue, but the protection element may also absorb and/or disperse a portion of the energy depending on the material used. This first method also uses an optional laser absorption element 42 to contain the reflected laser energy. As shown by FIG. 1, protection element 40 is positioned near the ends of the optical fibers 10 and a laser absorption element 42 is disposed above the first row 16 of optical fibers 10 to inhibit the travel of any reflected laser energy from protection element 40.

Figure 2:
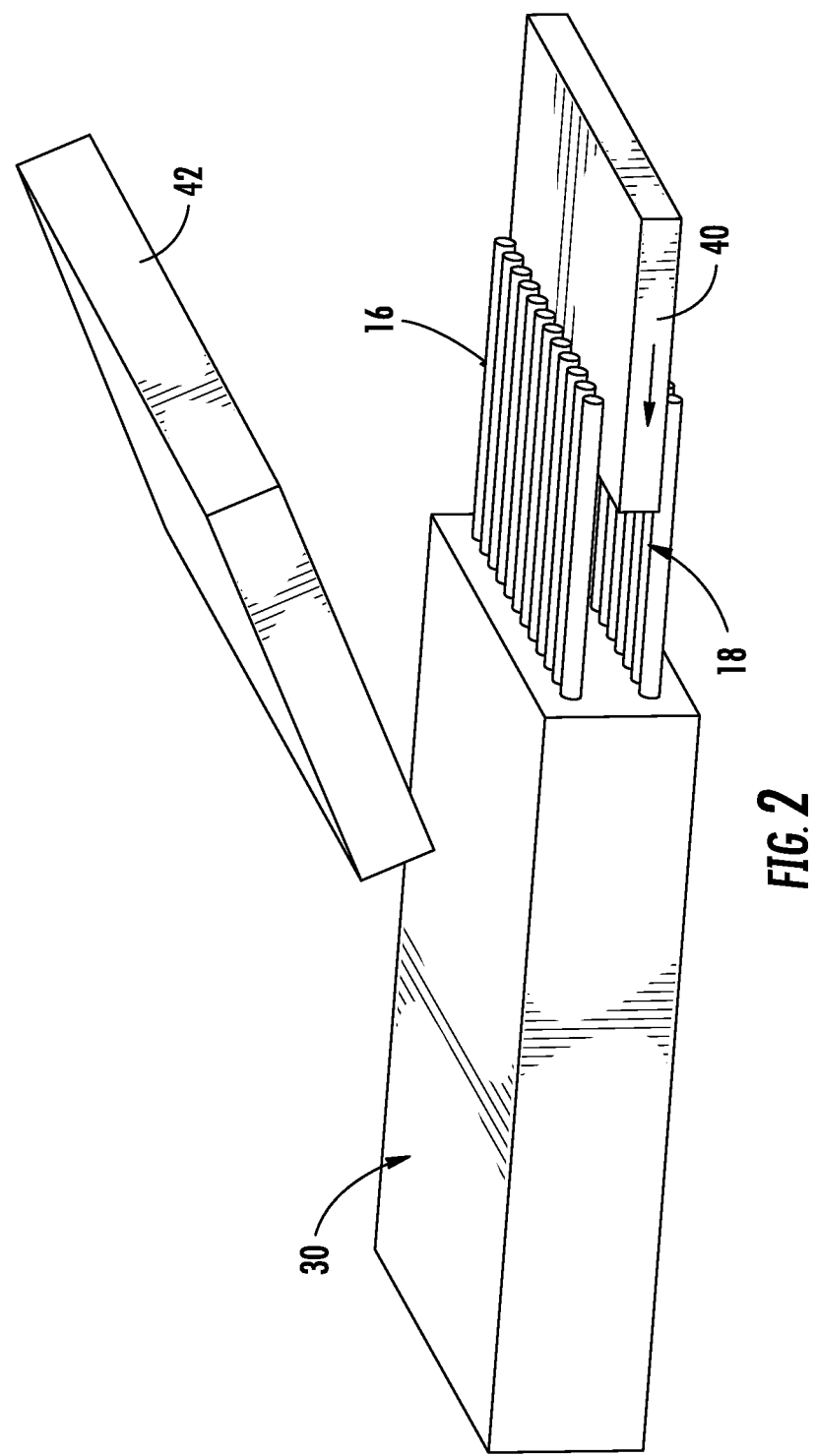
Figure 3:
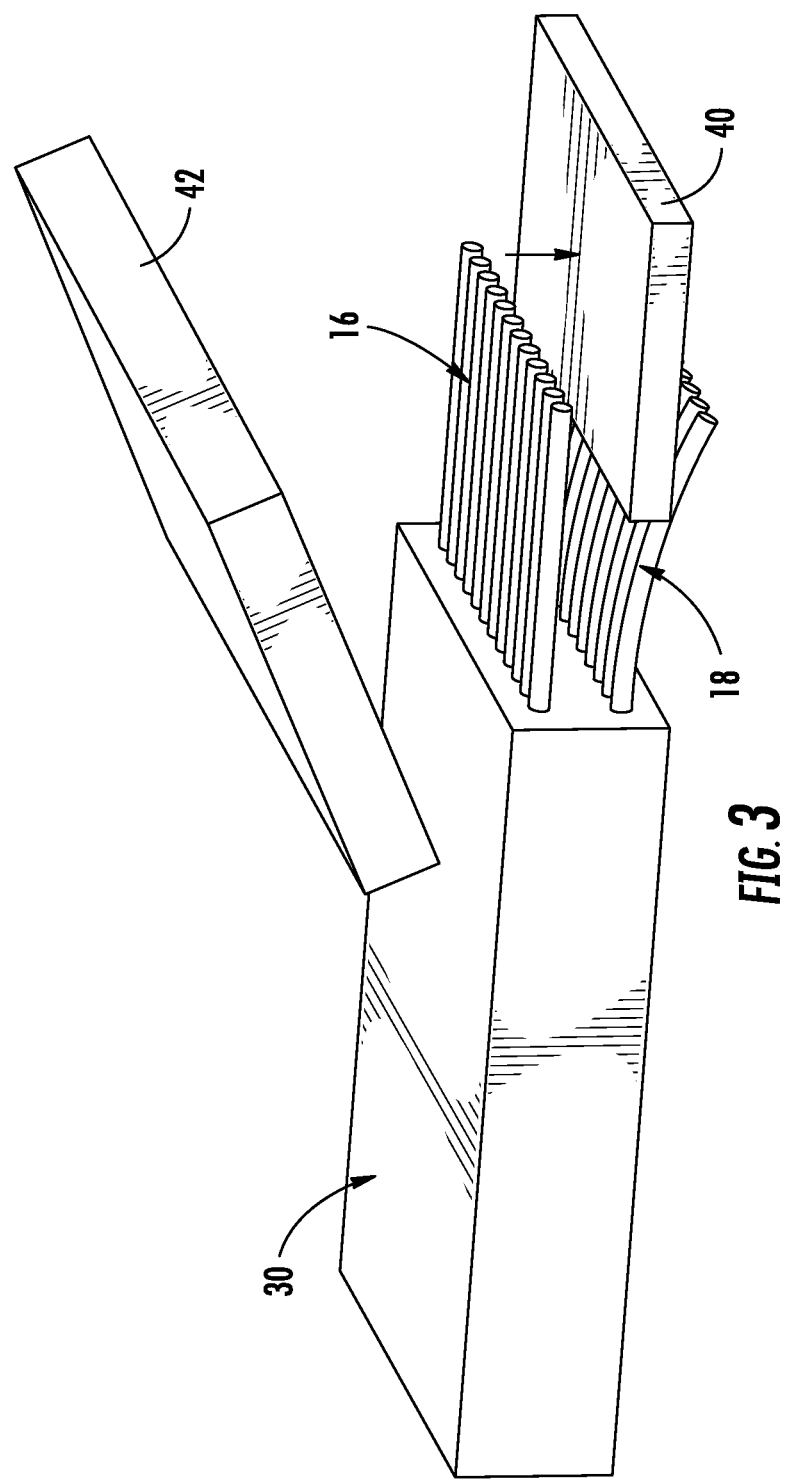
Figure 4:
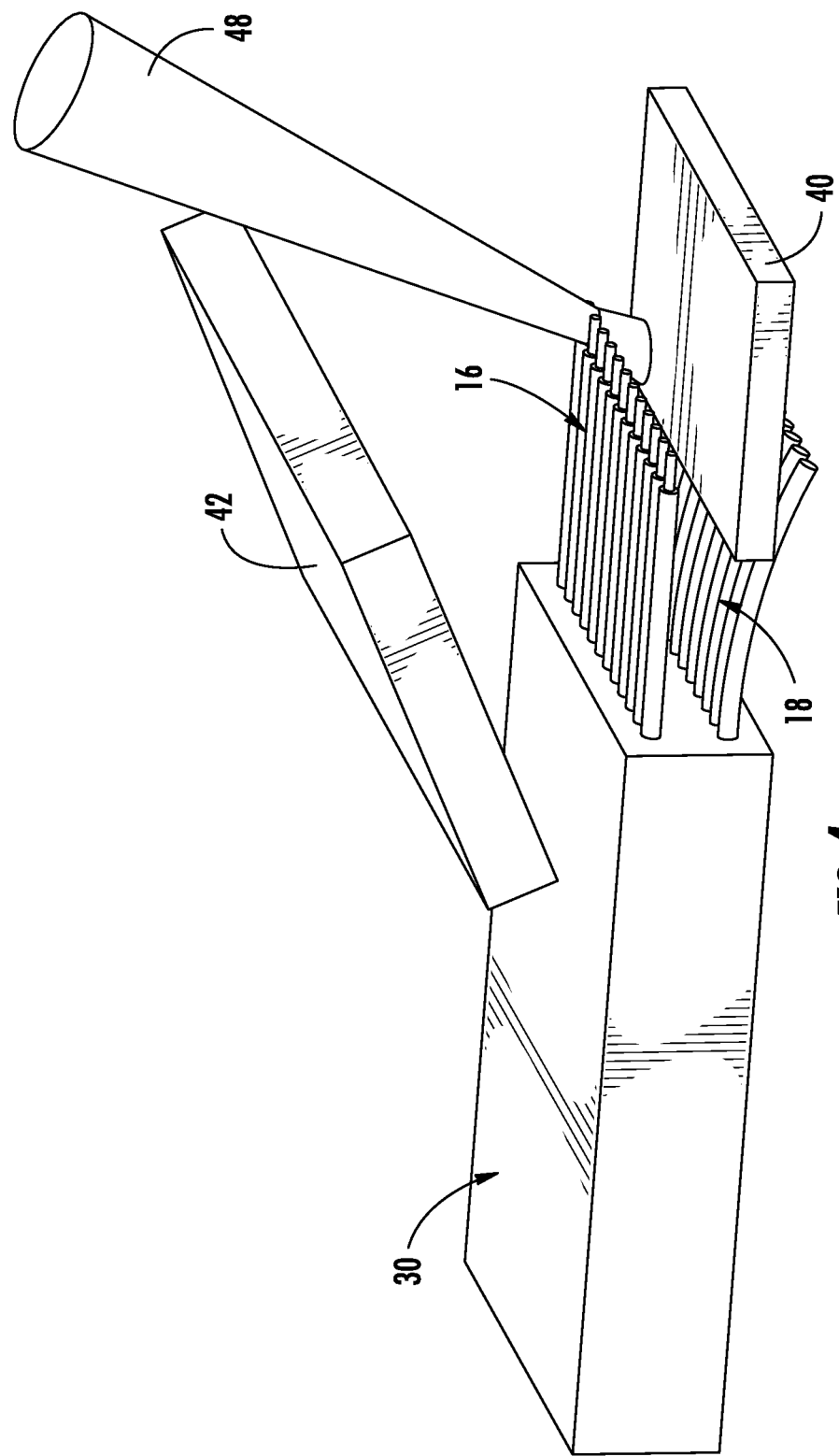

FIGS. 2-6 depict the other steps for processing optical fibers using the first method. FIG. 2 shows protection element 40 being positioned adjacent to the plurality of the optical fibers for presenting a first row (i.e., first group) of optical fibers for laser processing and shielding a second row (i.e., second group) of optical fibers from the laser processing. As depicted in this configuration, protection element 40 is inserted between the first row 16 and the second row 18 of optical fibers 10 as represented by the arrow so that the first row of optical fibers 16 may be laser processed while the second row 18 of optical fibers is shielded from the laser. Thereafter, the protection element 40 may optionally translate for pushing the second row 18 of optical fibers away from the first row 16 of optical fibers as represented by the arrow in FIG. 3. Pushing the second row 18 of optical fibers away from the first row 16 creates more space between the first row 16 of optical fibers and protection element 40. As shown in FIG. 4, the created space allows the laser energy to diverge before impacting protection element 40 and being reflected. Allowing a laser beam 48 to diverge after processing the optical fibers can inhibit excess removal of the coating from the optical fiber by reducing the energy density (i.e, the energy is spread over a larger area compared with the beam waist). In other words, the increased space allows the laser beam 48 to diverge after contacting the optical fibers and before being reflected.

Other variations for using the protection element 40 and/or laser absorbing element 42 are possible. As a variation on FIG. 4, the laser beam 48 may initially pass thru an opening on top plate 42 before impacting the fibers so that the top plate 42 also acts as a shield for the incoming laser beam 48. Additionally, the methods and configurations for laser processing disclosed herein may use lenses, mirrors, beam splitters or the like for directing the laser beam to the optical fibers. Although the laser beam of FIG. 4 is shown approaching from a single-side, other embodiments that directed the laser beam one or more sides such as from both sides are contemplated with the concepts disclosed herein.

Figure 5:
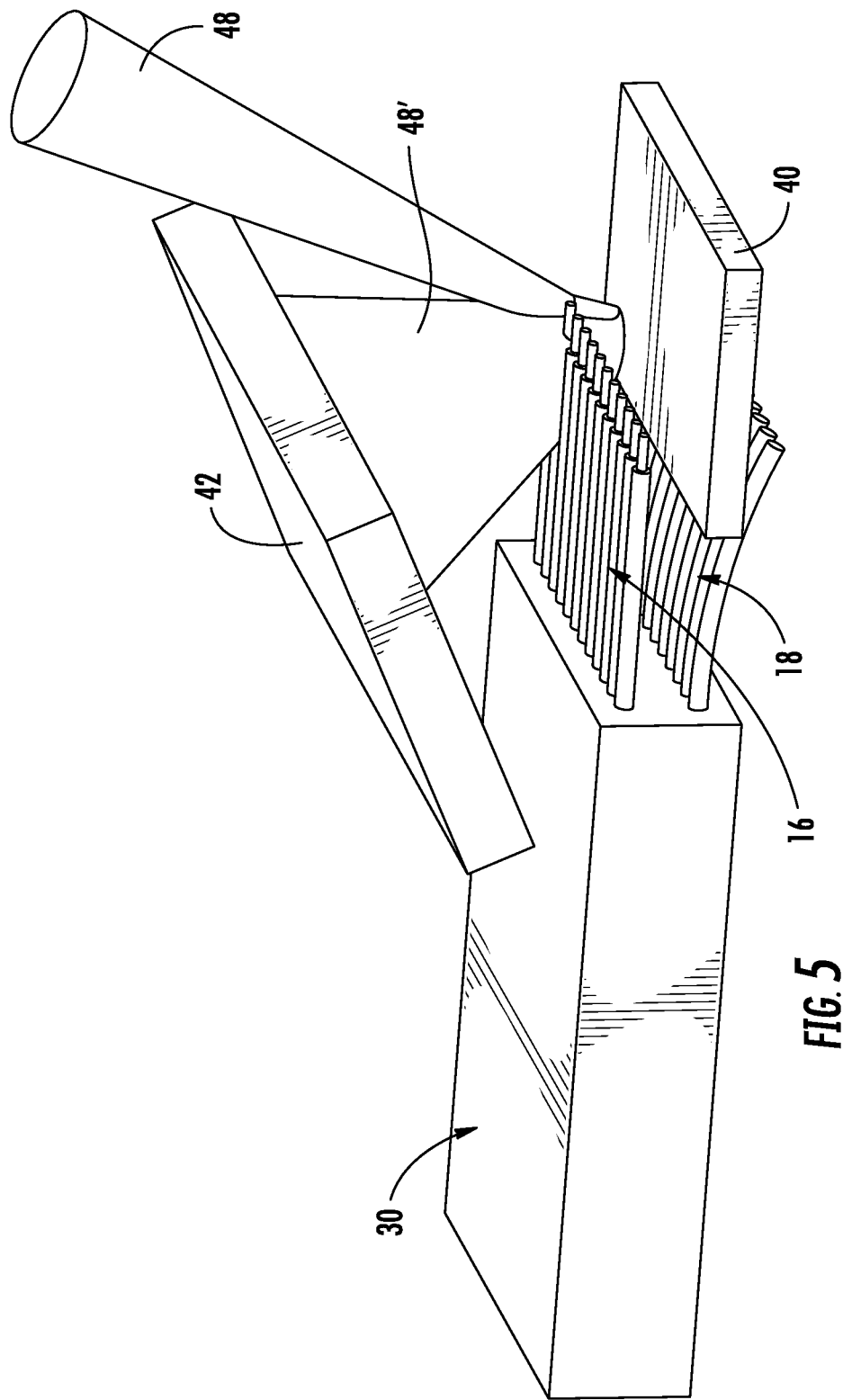
Figure 6:
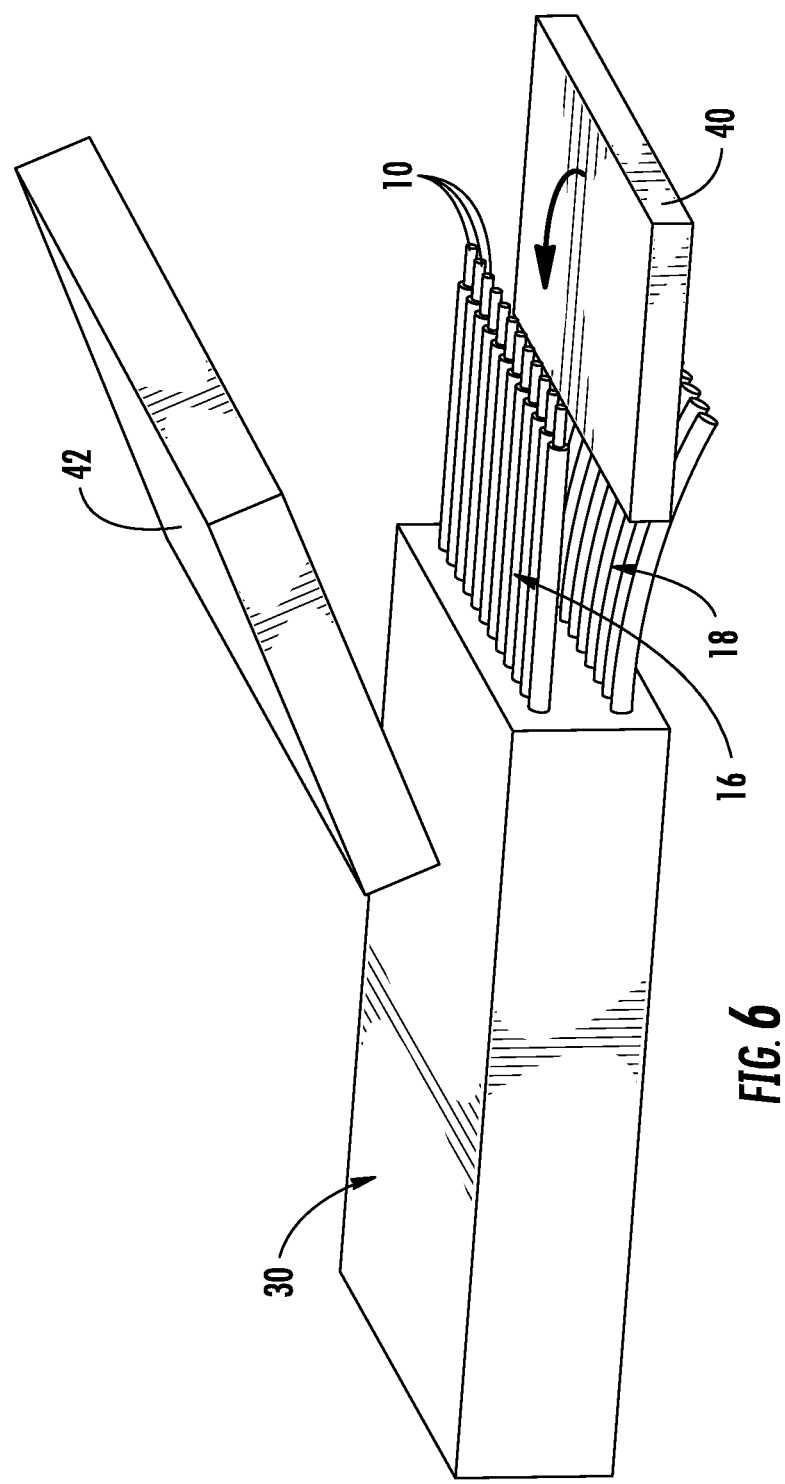
Figure 7:
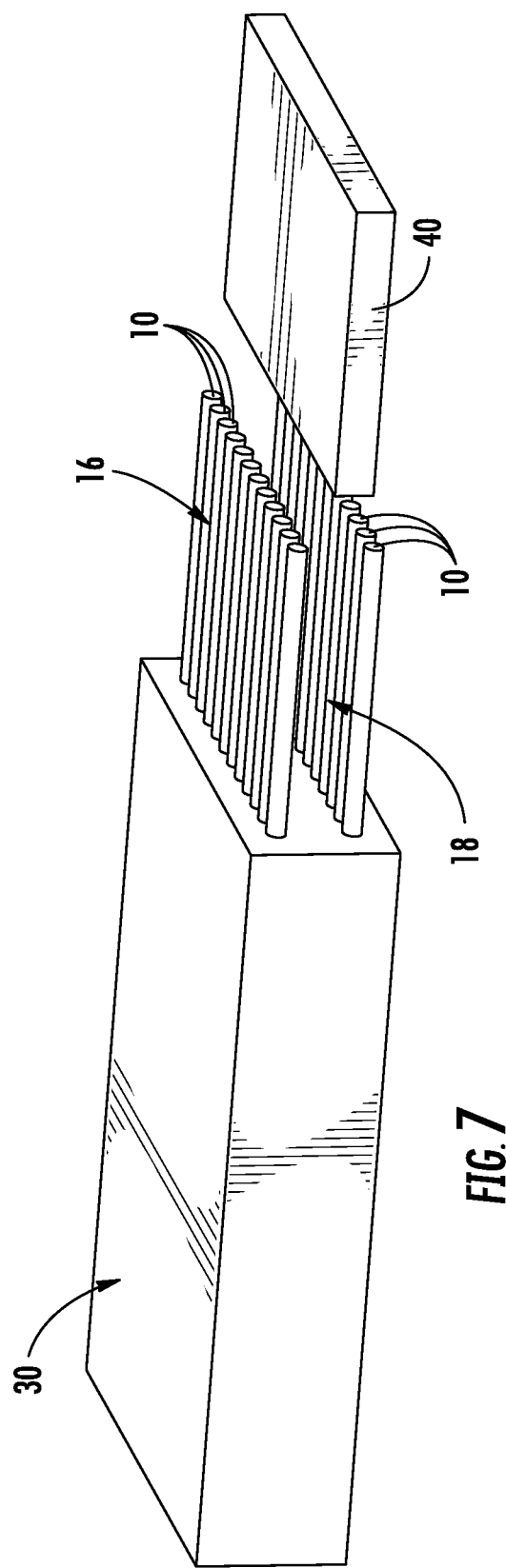
FIGS. 7-11 schematically depict a second method for laser processing a plurality of optical fibers using a protection element disposed between a first row and a second row of optical fibers.

FIG. 5 depicts a portion of the laser beam 48 being reflected off protection element 40 and a reflected beam 48' impacting absorption element 42. During laser processing, the laser beam 48 may be swept across the first row 16 in any suitable manner to process the optical fibers 10. FIG. 6 depicts structure 30 after laser processing the first row 16 of optical fibers 10. Thereafter, a similar process may be repeated on the second row 18 of optical fibers 10 or repeated for a further row or grouping of fibers. Additionally, protection element 40 may be rotated and/or translated as represented by the arrow in FIG. 6 for presenting a fresh surface as described above.

Figure 8:
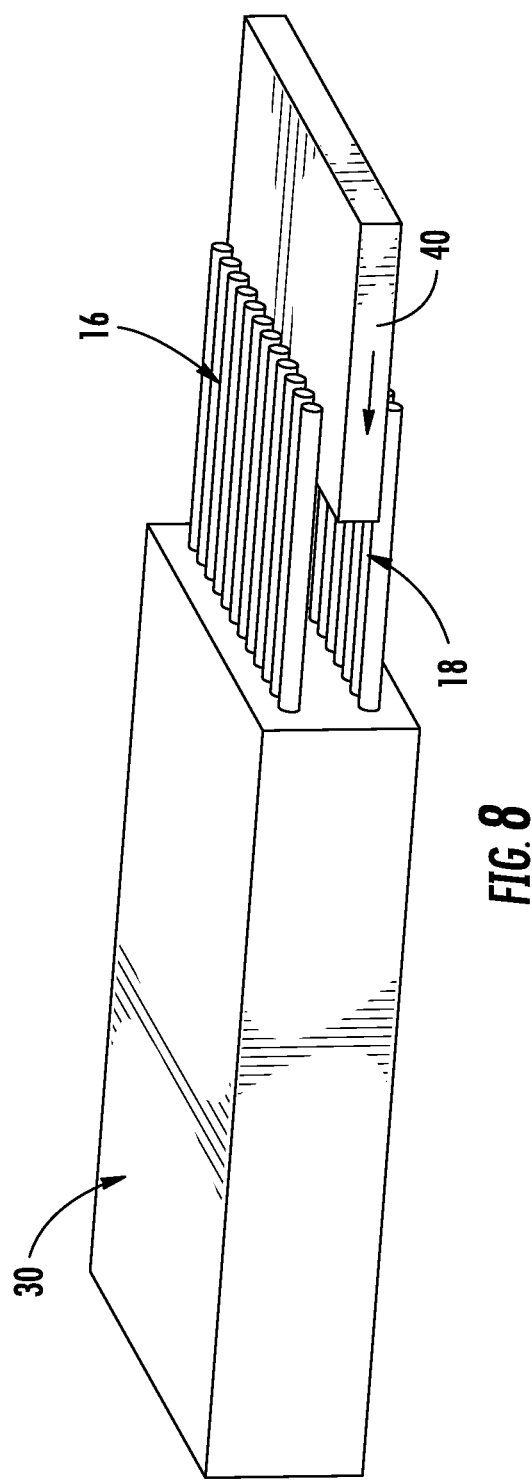
Figure 9:
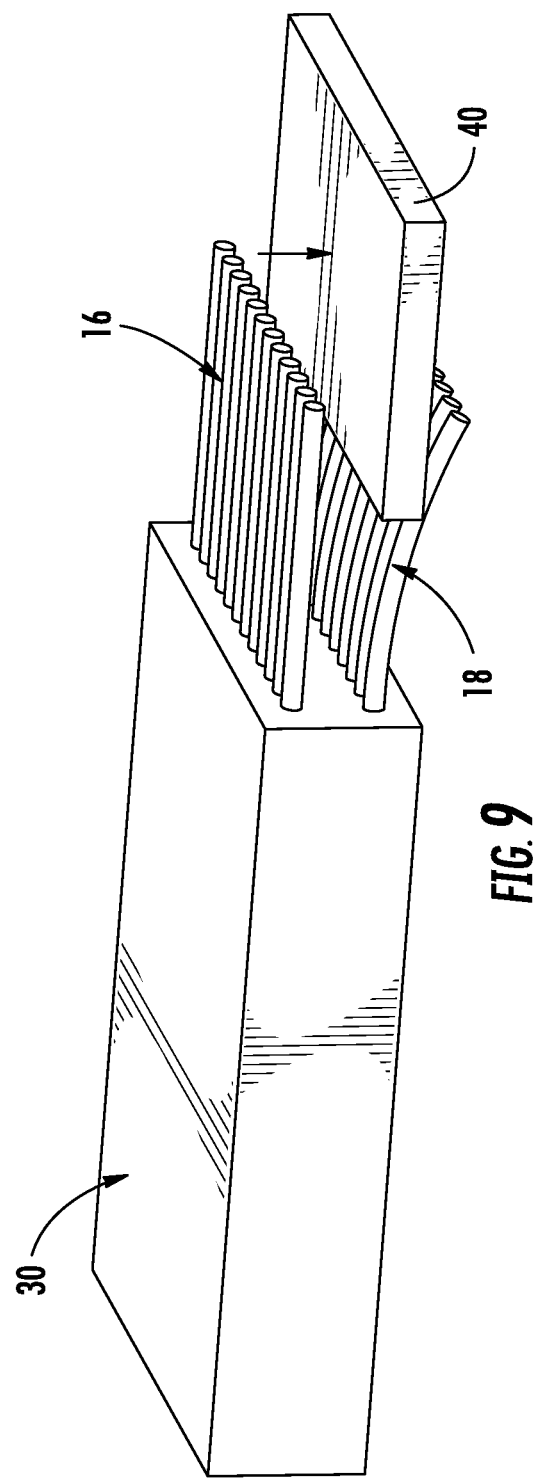
Figure 10:
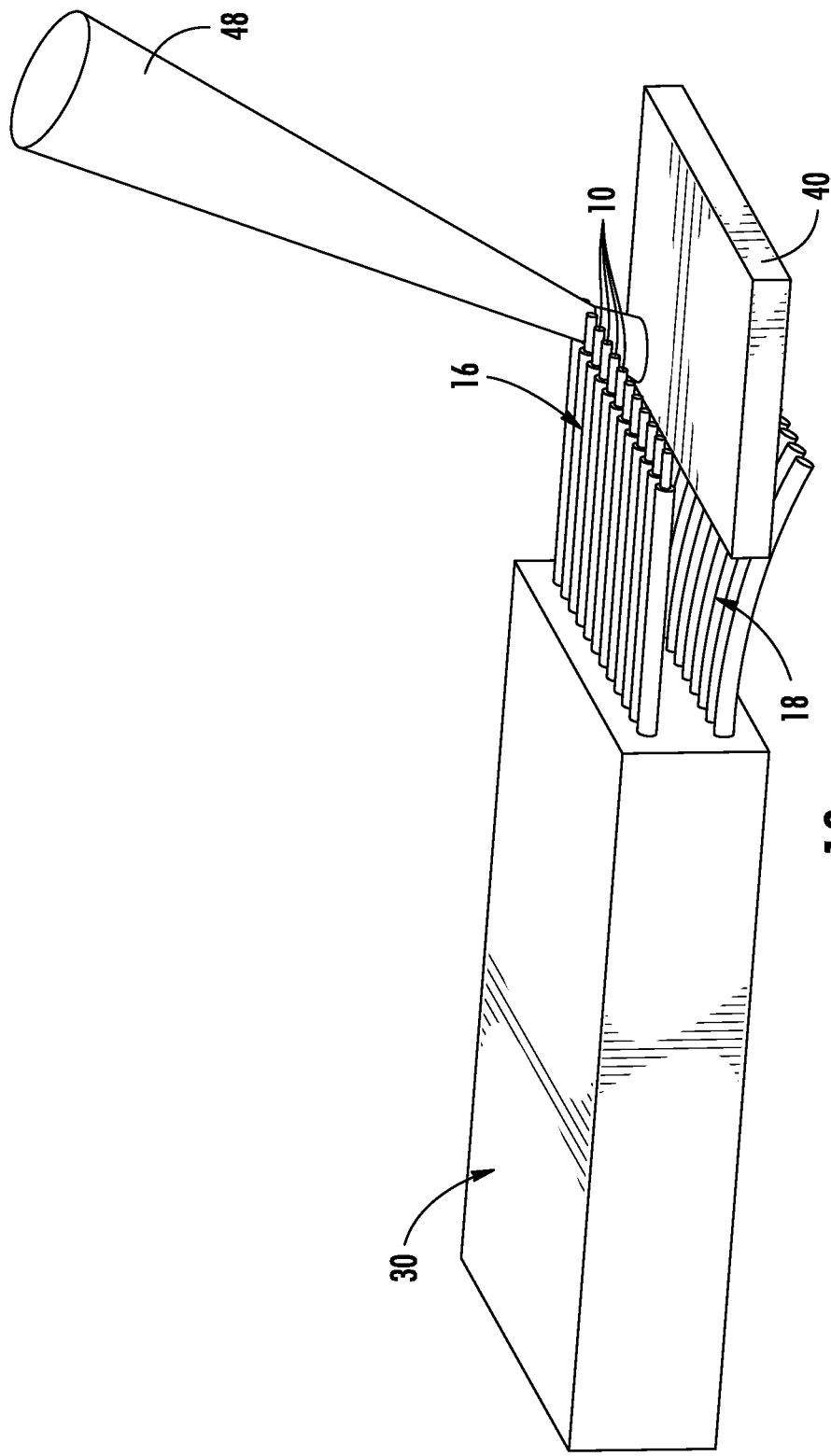
Figure 11:
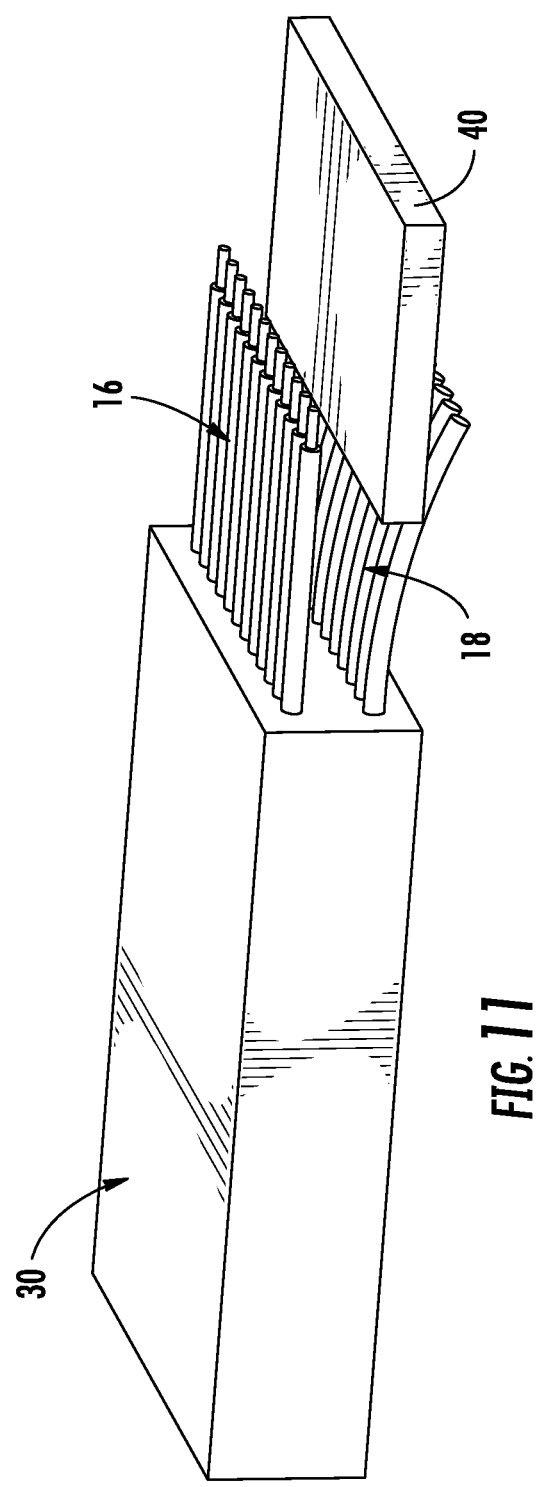
Figure 12:
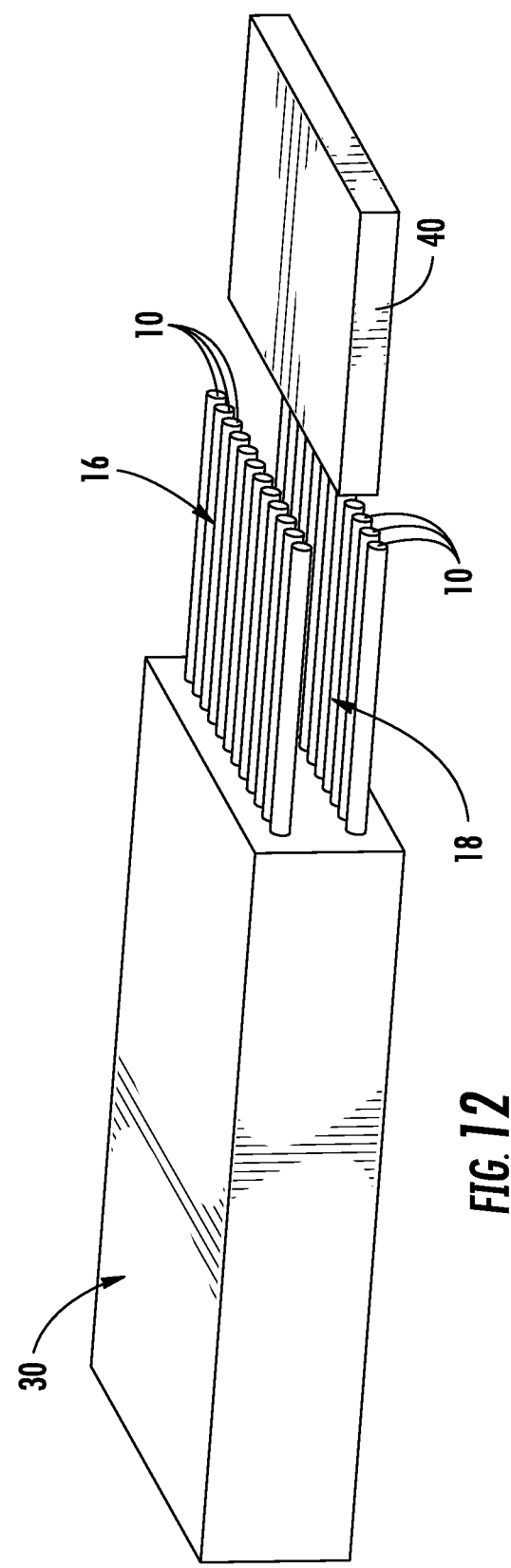
FIGS. 12-17 schematically depict a third method for laser processing a plurality of optical fibers using a protection element disposed between a first row and a second row of optical fibers.

FIGS. 7-11 schematically depict a second method for laser processing a plurality of optical fibers 10 using protection element 40. The second method is similar to the first method, except that the protection element 40 is formed from a material having a high degree of absorption (i.e., ideally no reflection). FIG. 8 shows protection element 40 being inserted between the first row 16 and the second row 18 of optical fibers 10 as represented by the arrow. Thereafter, the protection element 40 may optionally translate for pushing the second row 18 of optical fibers away from the first row 16 of optical fibers as represented by the arrow in FIG. 9. Pushing the second row 18 of optical fibers away from the first row 16 creates more space between the first row 16 of optical fibers and protection element 40. Additionally, an optional absorption element (not shown) may be placed above the first row 16 of optical fibers for safety. As shown in FIG. 10, the created space allows the laser energy to diverge before impacting protection element 40. Allowing a laser beam 48 to diverge from the beam waist after contacting and processing the optical fibers reduces the energy density that impacts protection element 40 and generally speaking prolongs its life. During laser processing, the laser beam 48 may be swept across the first row 16 in any suitable manner to process the optical fibers 10. FIG. 11 shows the first row 16 of optical fibers 10 after laser processing and a similar process may be repeated on the second row 18 of optical fibers 10 such as by flipping the structure 30 or using a second laser from the other side.

Figure 13:
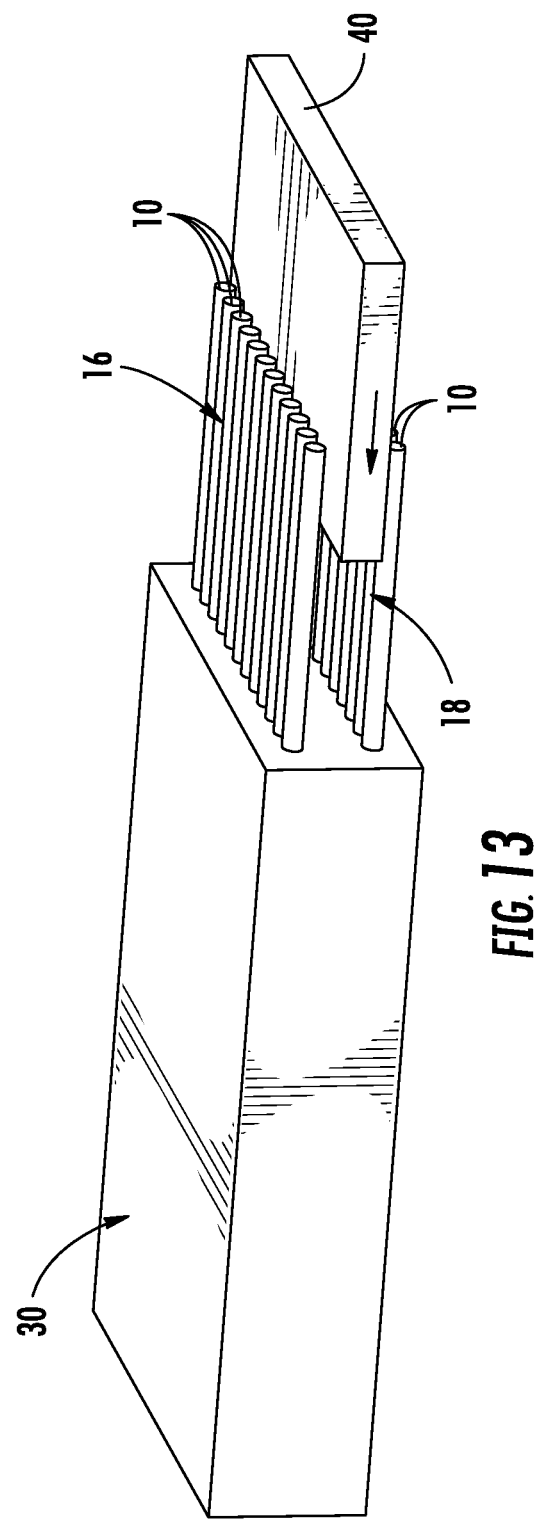
Figure 14:
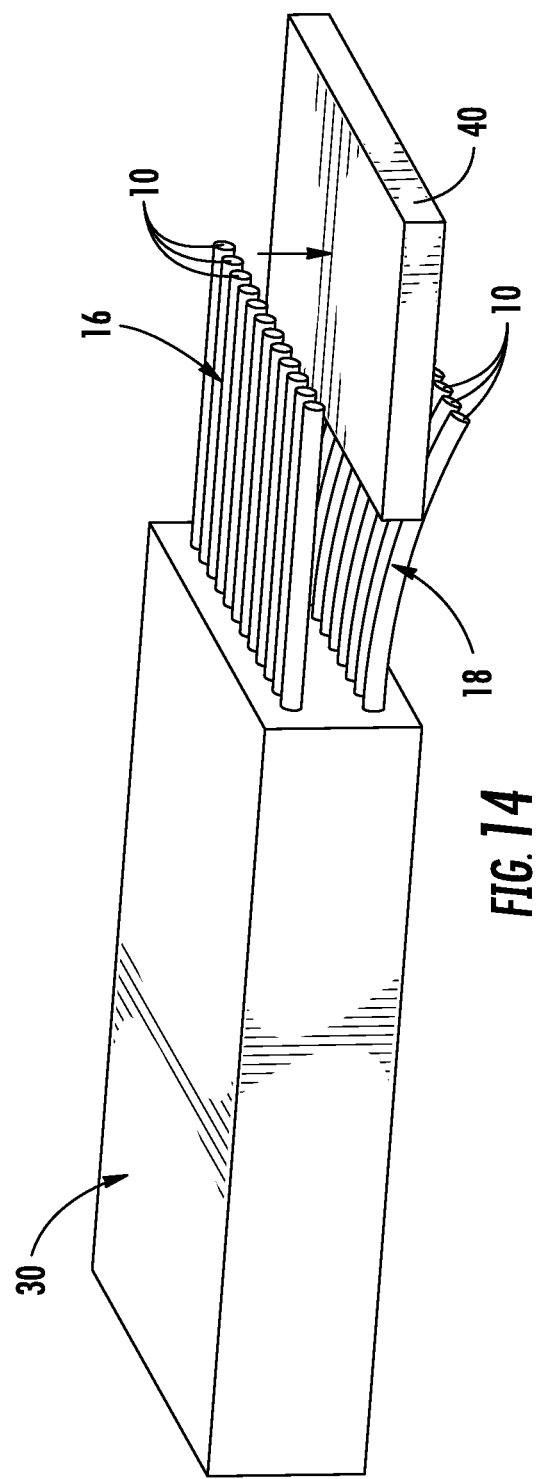
Figure 15:
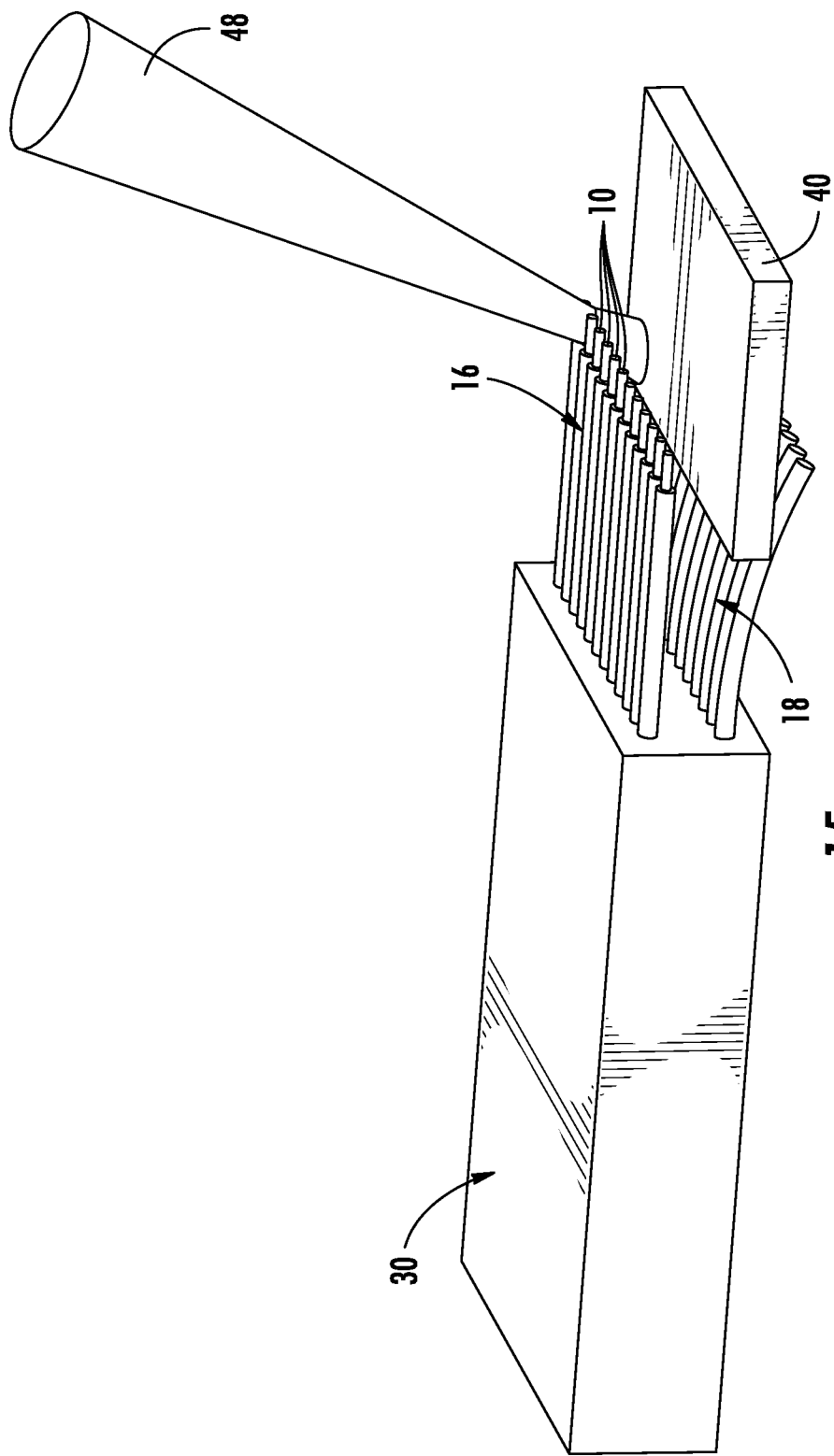
Figure 16:
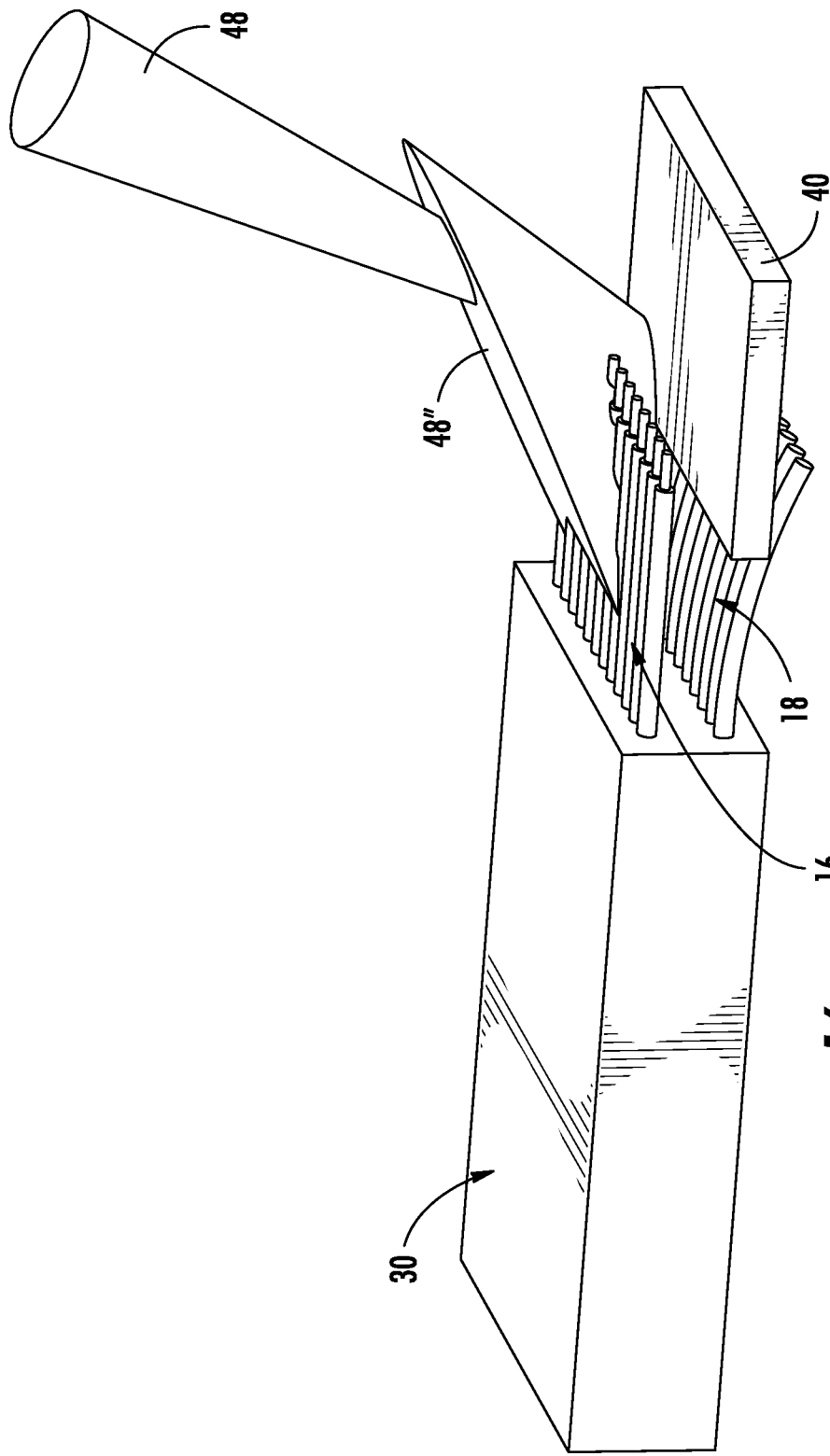
Figure 17:
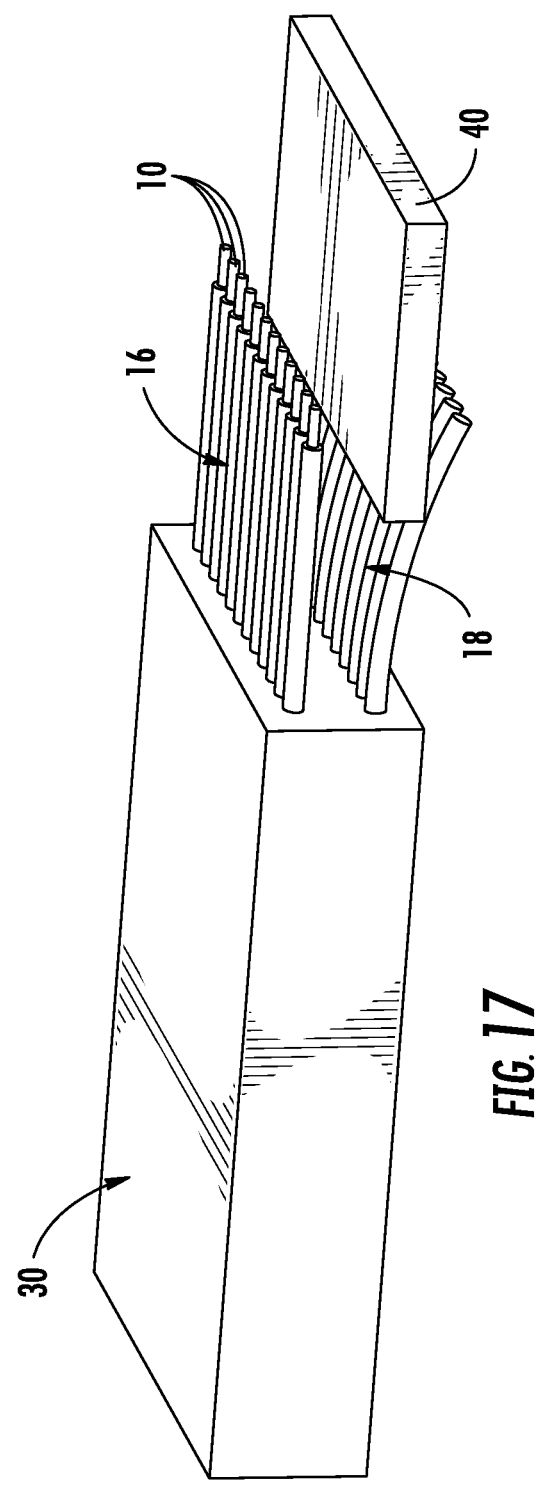

FIGS. 12-17 schematically depict a third method for laser processing a plurality of optical fibers 10 using protection element 40. The third method is similar to the first and second methods, except that the protection element 40 is formed from a material having a high degree of dispersion. FIG. 13 shows protection element 40 being inserted between the first row 16 and the second row 18 of optical fibers 10 as represented by the arrow. Thereafter, the protection element 40 may optionally translate for pushing the second row 18 of optical fibers away from the first row 16 of optical fibers as represented by the arrow in FIG. 14. As stated before, pushing the second row 18 of optical fibers away from the first row 16 creates more space between the first row 16 of optical fibers and protection element 40, thereby allowing the laser beam to diverge before impacting protection element 40 as shown in FIG. 15. Additionally, an optional absorption element (not shown) may be placed above the first row 16 of optical fibers for safety. FIG. 16 depicts the laser beam 48 diverging after being reflected from protection element 40. As with the other methods, the laser beam 48 may be swept across the first row 16 in any suitable manner to process the optical fibers 10. FIG. 17 shows the first row 16 of optical fibers 10 after laser processing and a similar process may be repeated on the second row 18 of optical fibers 10 such as by flipping the structure 30 or using a second laser from the other side.

Although the methods disclosed show processing an array of optical fibers having two rows as shown, structures having more rows and/or other array arrangements of optical fibers can be processed using the concepts disclosed herein. For instance, processing more than two rows may involve bending the upper rows out of the way such as by using a second protective element so that particular individual rows can be exposed and processed with the laser beam. Consequently, much larger arrays of optical fibers may be laser processed using the concepts disclosed herein.

Figure 17A:
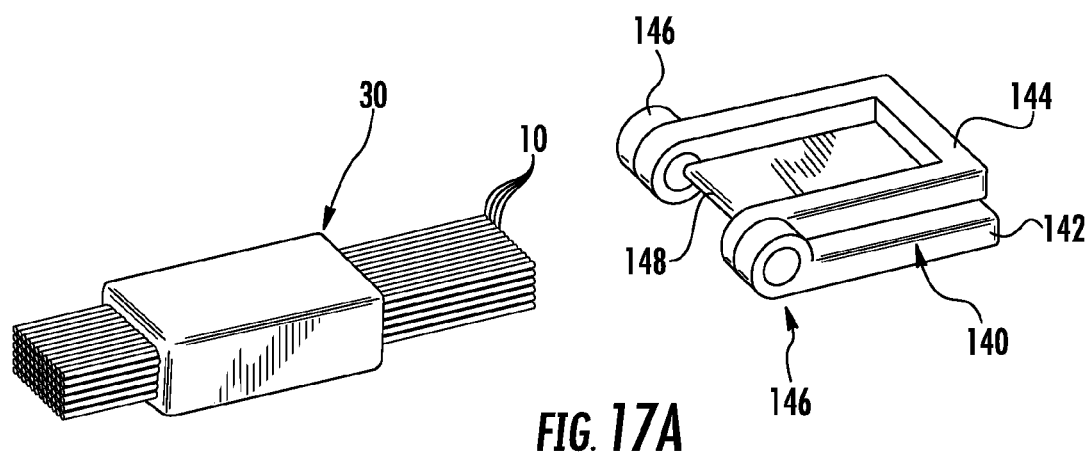
FIGS. 17A-17G depict another protection element for laser processing a plurality of optical fibers in a plurality of rows.
Figure 17B:
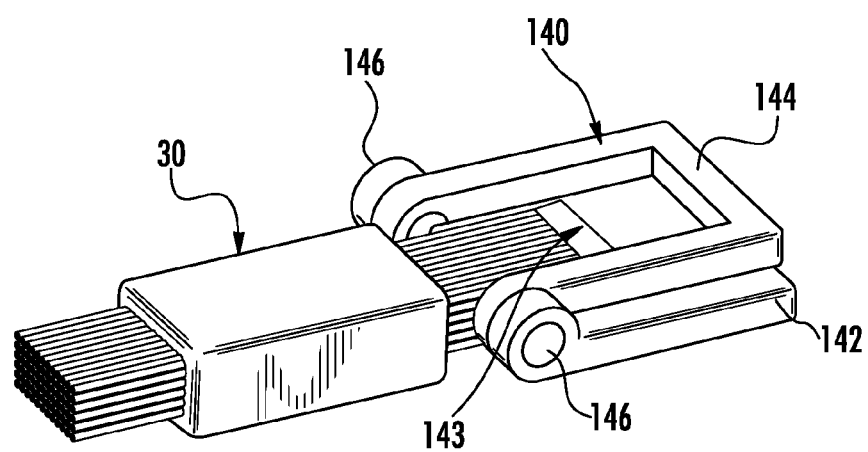
Figure 17C:
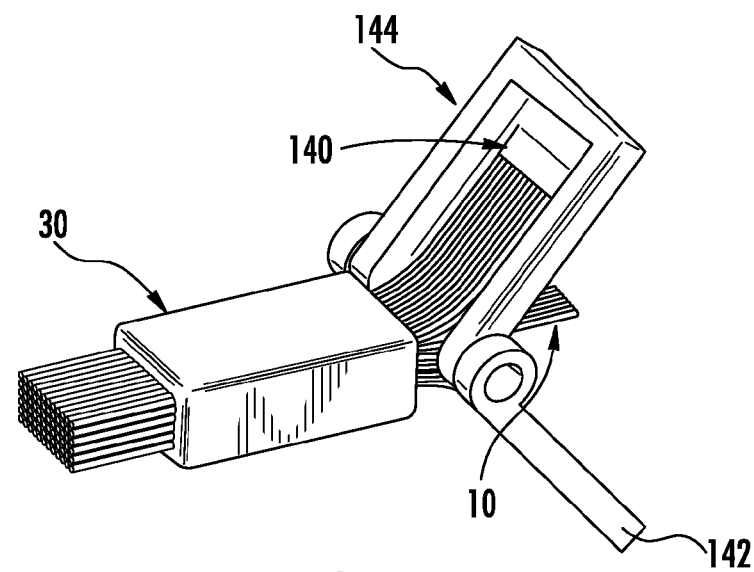

FIGS. 17A-17G depict another protection element 140 configured as a fiber separation device having a hinge 146 for laser processing an array of optical fibers. Protection element 140 aids when processing optical fibers 10 of structure 30 having a relatively small pitch among the groups of fibers (i.e., relatively tight spacing among the fibers) and especially advantageous when there are three or more rows of fibers. FIG. 17A shows the fiber separation device having a lower portion (or first portion) 142 and a upper portion (or second portion) 144 connected by hinge 146, thereby allowing relative movement between the lower portion 142 and upper portion 144. FIG. 17B shows the protection element 140 positioned about the optical fibers of structure 30. Moreover, the lower portion 142 and the upper portion 144 form a space 148 between hinge 146 so that the one or more fibers being processed by the laser can pass through the space 148 as best shown in FIG. 17C. Protection element 140 may also optionally include one or more recesses or trays 143 for positioning optical fibers therein.

Figure 17D:
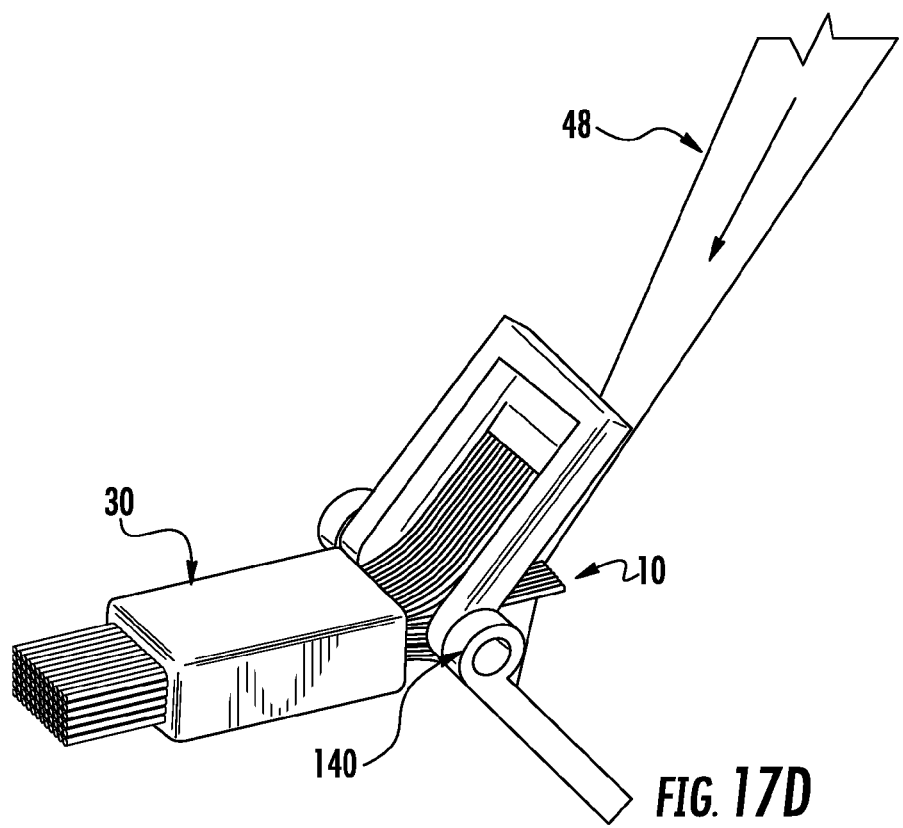
Figure 17E:
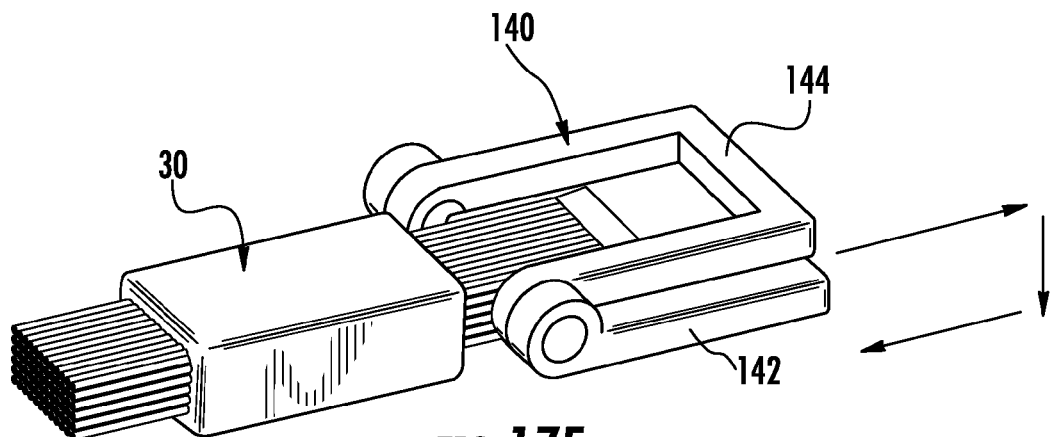
Figure 17F:
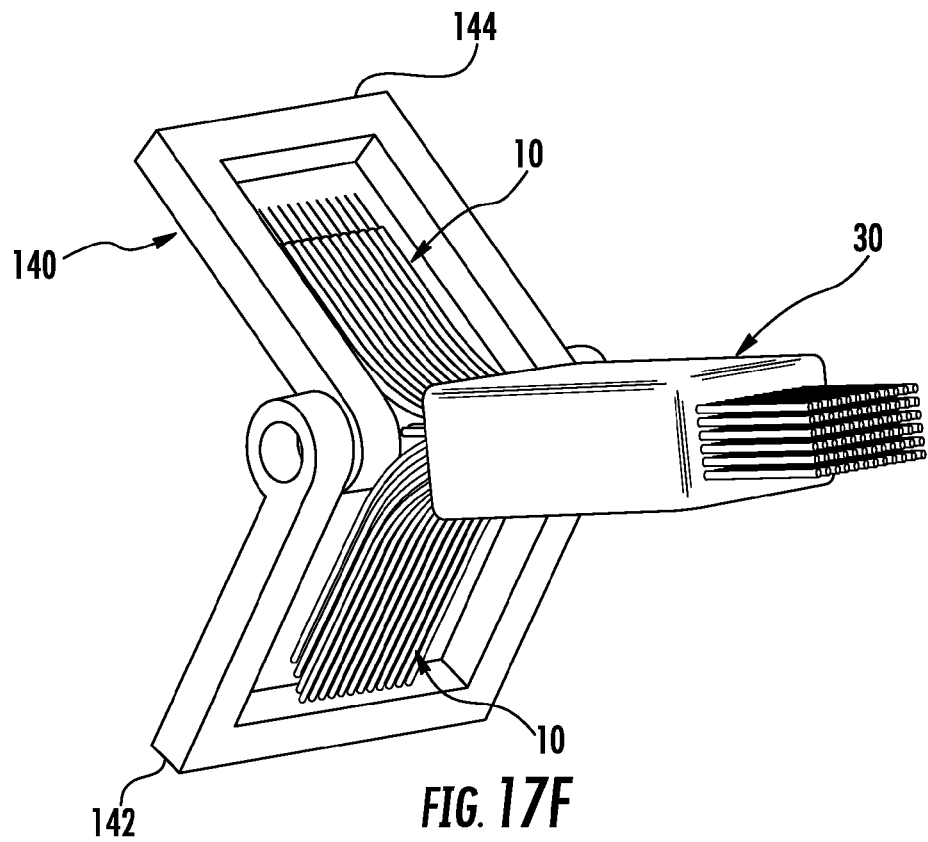
Figure 17G:
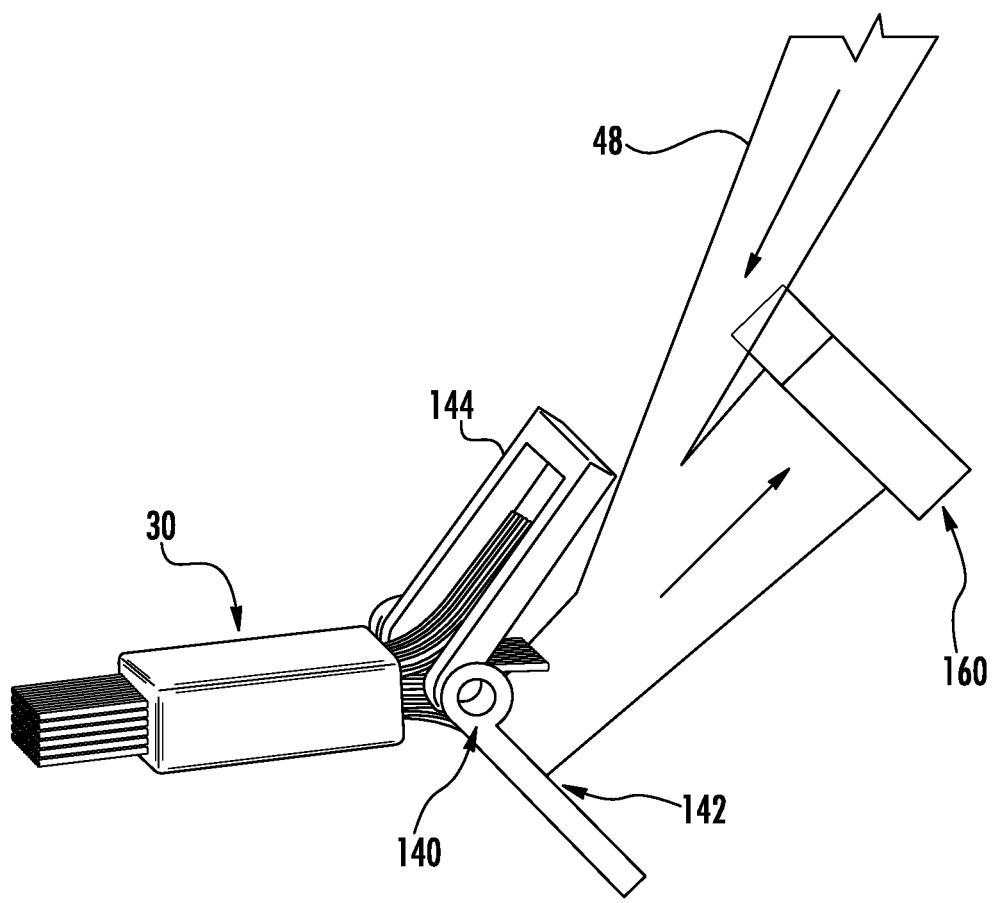

In other words, the protective element 140 is positioned so that the hinge 146 is pointing towards the ends of the optical fibers of structure 30 as shown by FIG. 17A. The fibers of structure 30 intended for processing are positioned so that they enter the space 148 of protection element 140 and are positioned between lower portion 142 and upper portion 144 as shown in FIG. 17B. The other rows of fibers not intended for laser processing are located either below the lower portion 142 or above the upper portion 144 so that they are positioned out of the way. Thereafter, the lower portion 142 and/or upper portion 144 can rotate (i.e., be spread apart) for providing access to the row of optical fibers intended for processing such as shown by FIG. 17C. FIG. 17D shows the laser beam 48 being used to process a row of optical fibers and how the other fibers are shielded from the laser beam 48 using protective element 140. As one row of fibers is finished with laser processing, the structure 30 is moved outward to remove the processed fibers and downward to align the next row of fibers with the space 148 as the protection element is positioned to laser process the next row of fibers as shown in FIG. 17E. FIG. 17F shows a rear perspective view showing the laser processed fibers protected by the upper portion 144 and the fiber that still require processing protected by the lower portion 142. It is also possible to index the laser off a portion of the structure 30 and/or other locations for maintaining similar lengths of fibers in the array after laser processing. Protection element 140 may also be used with a device/element 160 for energy capture as depicted in FIG. 17G.

The protection elements disclosed herein can have other features that aid in the laser processing and/or inhibit damage to the optical fibers. For instance, the outer surface of the upper portion can have a relatively soft insert in recess 143 for cushioning the processed optical fibers, thereby inhibiting damage to the same. Likewise, the protection element can have an active cooling element such as running water through passages in the same for dissipating heat from the protective structure. As discussed above, the protection element can have a surface that reflects, absorbs and/or disperses a portion of the energy depending on the material and/or surface finishing selected. Of course other suitable structures are possible using the concepts disclosed herein. For instance, a protection element configured as a fiber separation device can be formed from two portions that operate in a similar manner to protection element 140 but are attached in another suitable manner besides a hinge such as a rib and slot for alignment and opening. Although protection element 140 is shown as having a hinge with a movable portion it is possible to fix the first and second portions at a fixed angle with a space therebetween and use the device in a similar manner by inserting the row of fibers for processing through the space of the device. After laser processing one or more structures having an array of optical fibers, the structure(s) may be used with a suitable fiber optic connector or other termination devices, thereby permitting a plurality of optical connections. This is advantageous since the craft can quickly and easily make a large number of optical connections with a relatively small footprint (i.e., high connection density). For instance, a fiber optic connector can have 24-fibers or more such as 36-fibers, 48-fibers or 72-fibers. Examples of fiber optic connectors and/or termination devices for use with these structures is disclosed herein, but other types of fiber optic connectors and/or termination devices may also employ optical fibers processed using the methods described herein.

FIG. 18 depicts a side view, a perspective view, and top view of two fiber optic splicing connectors 50 (hereinafter splicing connector) having an array of optical fibers 52 mated together using an adapter 90. The optical fibers 52 of splicing connectors 50 may be processed using a laser according to one of the methods disclosed herein, but other methods of process the same are possible.

Figure 19:
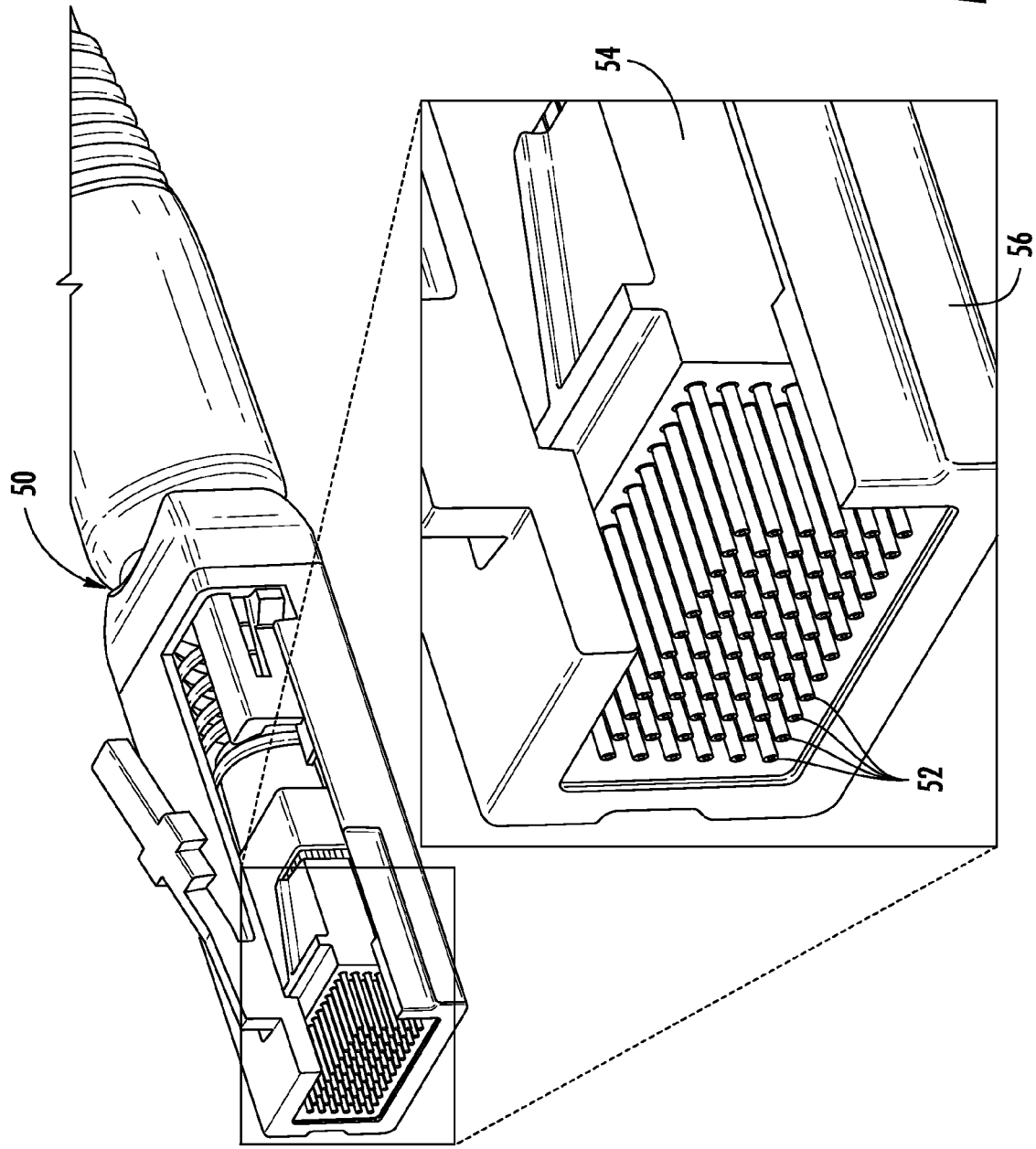
FIG. 19 is a partial sectional view of the fiber optic splicing connector of FIG. 18.

FIG. 19 is a partial sectional view along with an enlarged detail portion of splicing connector 50 showing a relatively long length of optical fibers 52 protruding from a fiber guide 54 within an outer housing 56. Optical fibers 52 have a relatively long length that extends beyond fiber guide 54 since they are aligned and spliced to complimentary mating optical fibers within adapter 90 without the use of a ferrule. In other words, the splicing connectors disclosed do not use a ferrule to support and mate optical fibers like conventional fiber optic connectors; but, rather are spliced with complimentary optical fibers in the adapter as discussed below. Simply stated, fiber guide 54 is used for supporting and aligning optical fibers 52 when mating splicing connector 50 within a splice guide of the adapter 90. Moreover, fiber guide 54 is biased to a forward position and can move relative to optical fibers 52 (i.e., translate backwards) for exposing a longer length of the same to extend into the splice guide of adapter 90.

Figure 20:
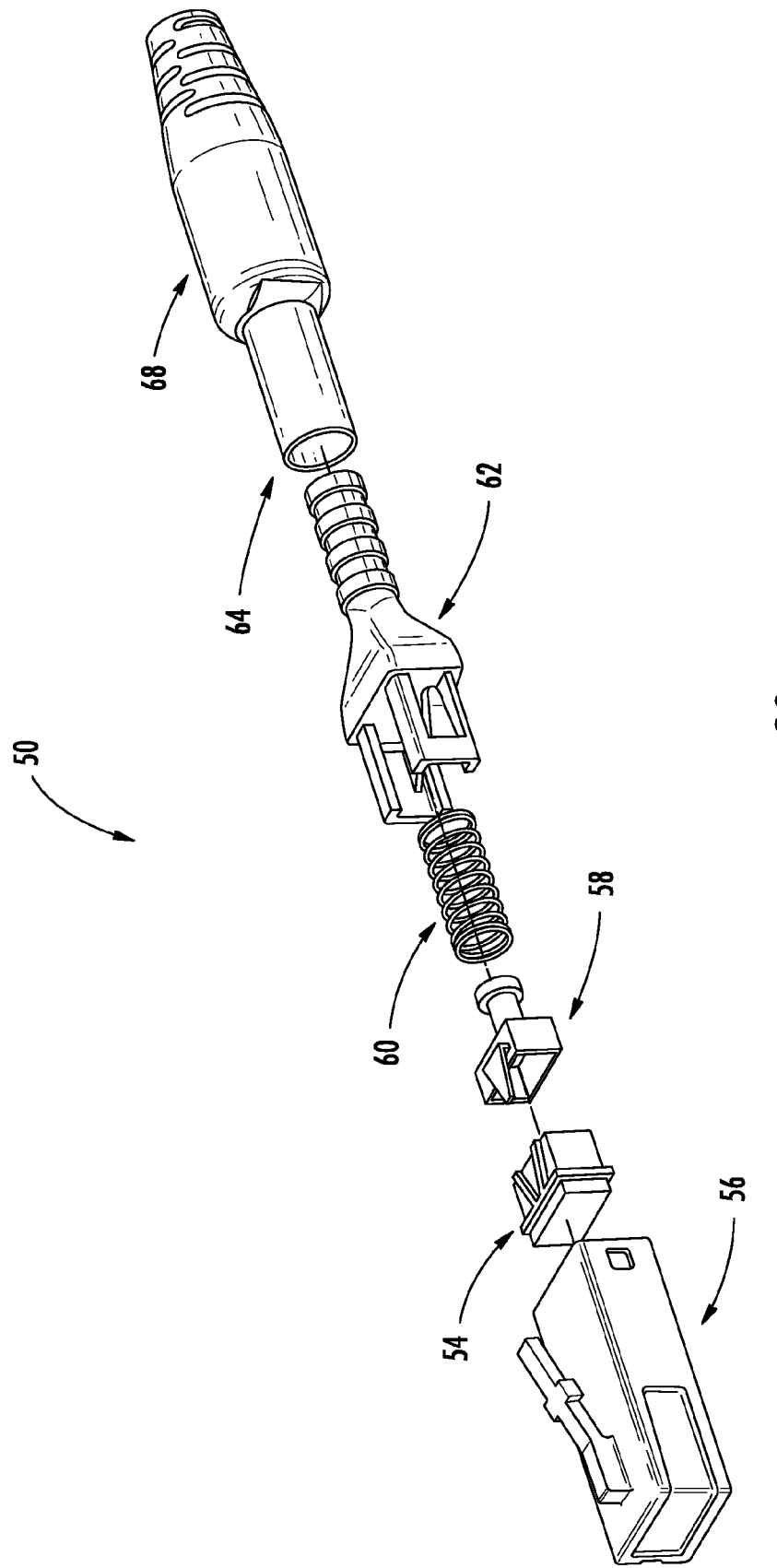
FIG. 20 is an exploded view of the fiber optic splicing connector of FIG. 19.

FIG. 20 is an exploded view of splicing connector 50 depicting the component and assembly of the same. As shown, splicing connector 50 includes fiber guide 54, outer housing 56, a spring push 58, a spring 60, a crimp body 62, a crimp band 64, and a boot 68. When assembled, fiber guide 54, spring push 58 and spring 60 are disposed between the outer housing 56 and crimp body 62. In other words, crimp body 62 includes a pair of latching fingers (not numbered) that cooperate with latching windows (not numbered) at the rear of outer housing for securing the components together. Consequently, fiber guide 54 is disposed within outer housing 56 as shown in FIG. 19 and is biased to the forward position by spring 60. Outer housing 56 can have any suitable configuration and is sized, shaped, keyed, latching features, etc. for mating with adapter 90. Crimp body 62 includes a passageway therethrough so that the optical fibers 52 may be routed to therethrough to the front portion of splicing connector 50. Crimp body 62 also includes a crimp portion at the rear for securing strength members of a fiber optic cable or the like using crimp band 64, thereby providing strain relief. Thereafter, boot 68 may placed over the rear portion of the crimp body 62 for completing the assembly. Other constructions for splicing connector are possible and splicing connectors may be mated with any suitable adapter for making splicing connections among optical fibers.

Figure 21:
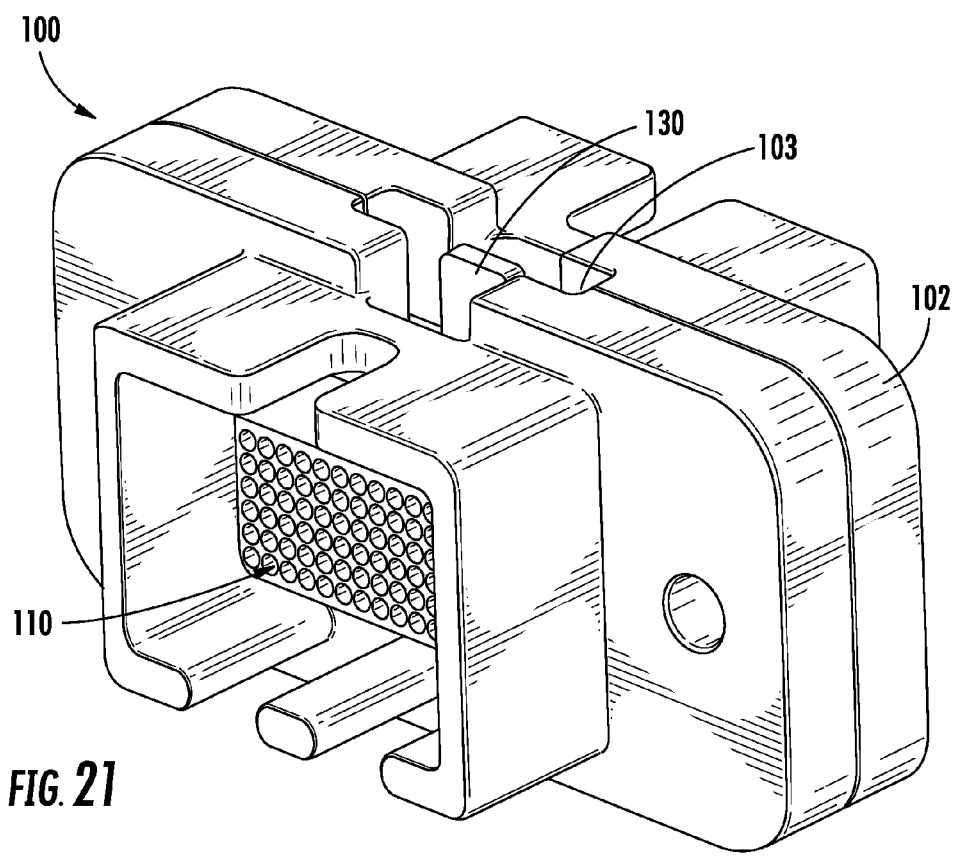
FIG. 21 is a perspective view of an adapter for mating fiber optic splicing connectors having a fiber guide for aligning and splicing optical fibers therein.
Figure 22:
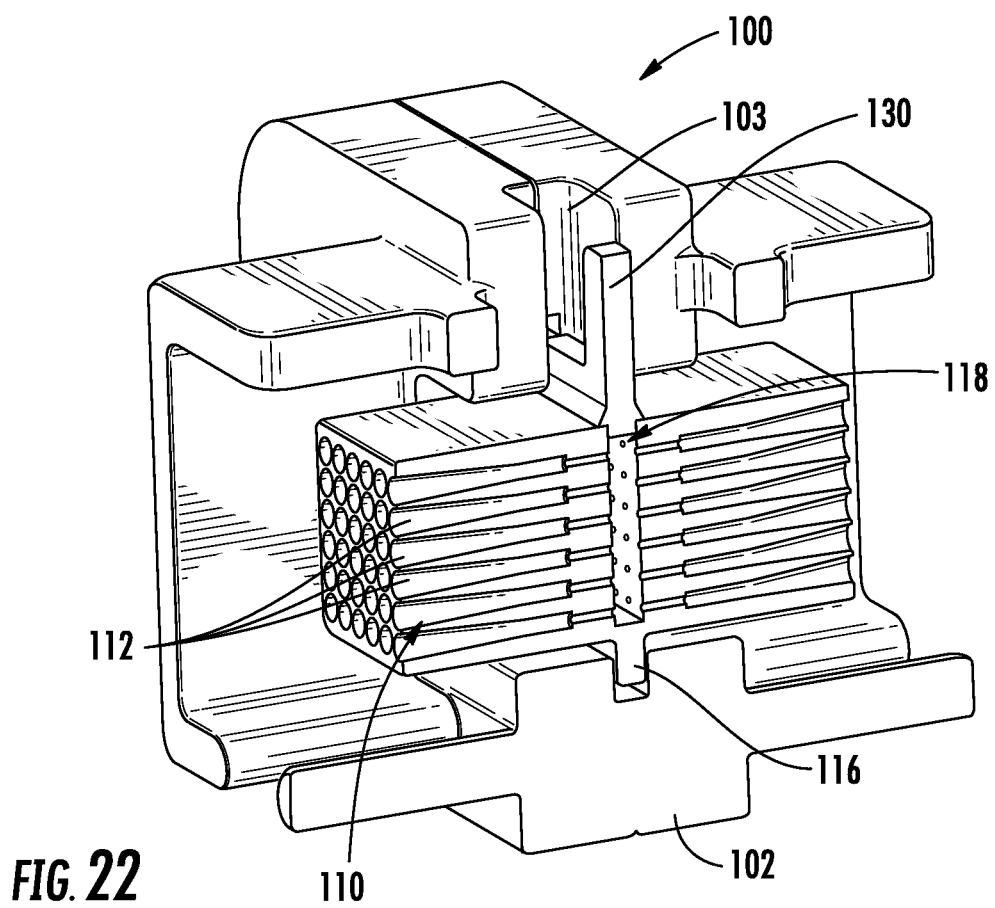
FIG. 22 is a cross-sectional view of the adapter of FIG. 21.

FIGS. 21 and 22 respectively depict a perspective view and cross-sectional view of one explanatory adapter 100 for receiving and mating splicing connectors similar to splicing connectors 50. Adapter 100 includes a housing 102, a splice guide 110, and a cap 130. Splice guide 110 is used for aligning and splicing optical fibers from the splicing connectors therein. Additionally, splice guide 110 includes a cavity 114. Cavity 114 can include one or more transmission elements for aiding the transmission of optical signals between the fibers of the splicing connectors received in opposite ends of adapter 100. For instance, the cavity can use a transmission element such as an index-matching material or beam expanding lenses for aiding the optical signal transmission therethrough. As an example, the cavity 114 may be a reservoir for an index matching material located between the fiber ends. Cavity 114 has an opening 118 for filling the cavity 114 and securing reservoir cap 130. Cavity 114 may be filled with a suitable index-matching material such as a gel for improving the optical connection between spliced optical fibers as known in the art. Thereafter, reservoir cap 130 may be secured splice guide 110 to inhibit the index-matching material from escaping. Additionally, housing 102 may have any suitable geometry for mounting, latching the splice connector, keying the splice connector, etc.

Figure 22A:
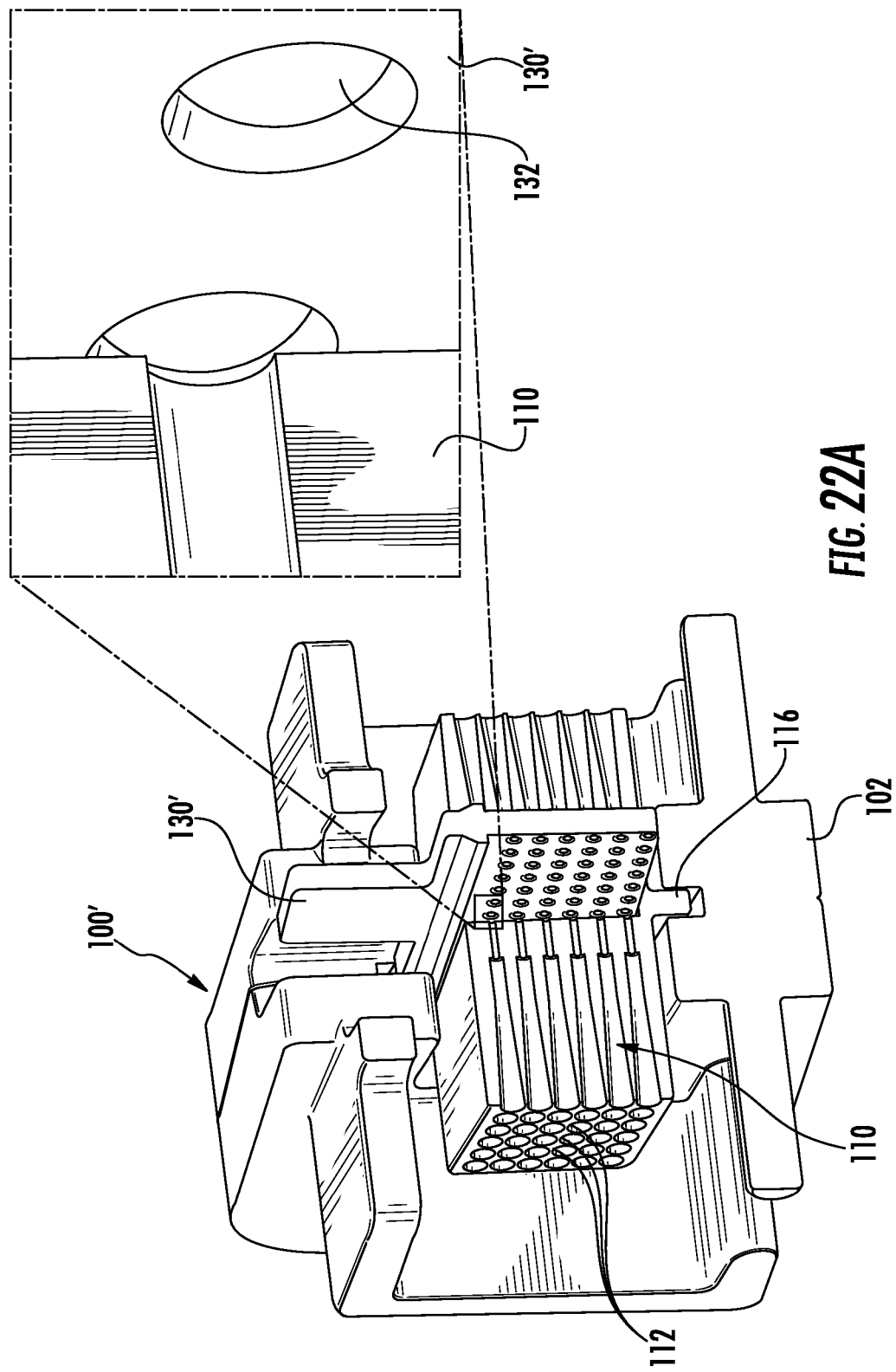
Figure 22B:
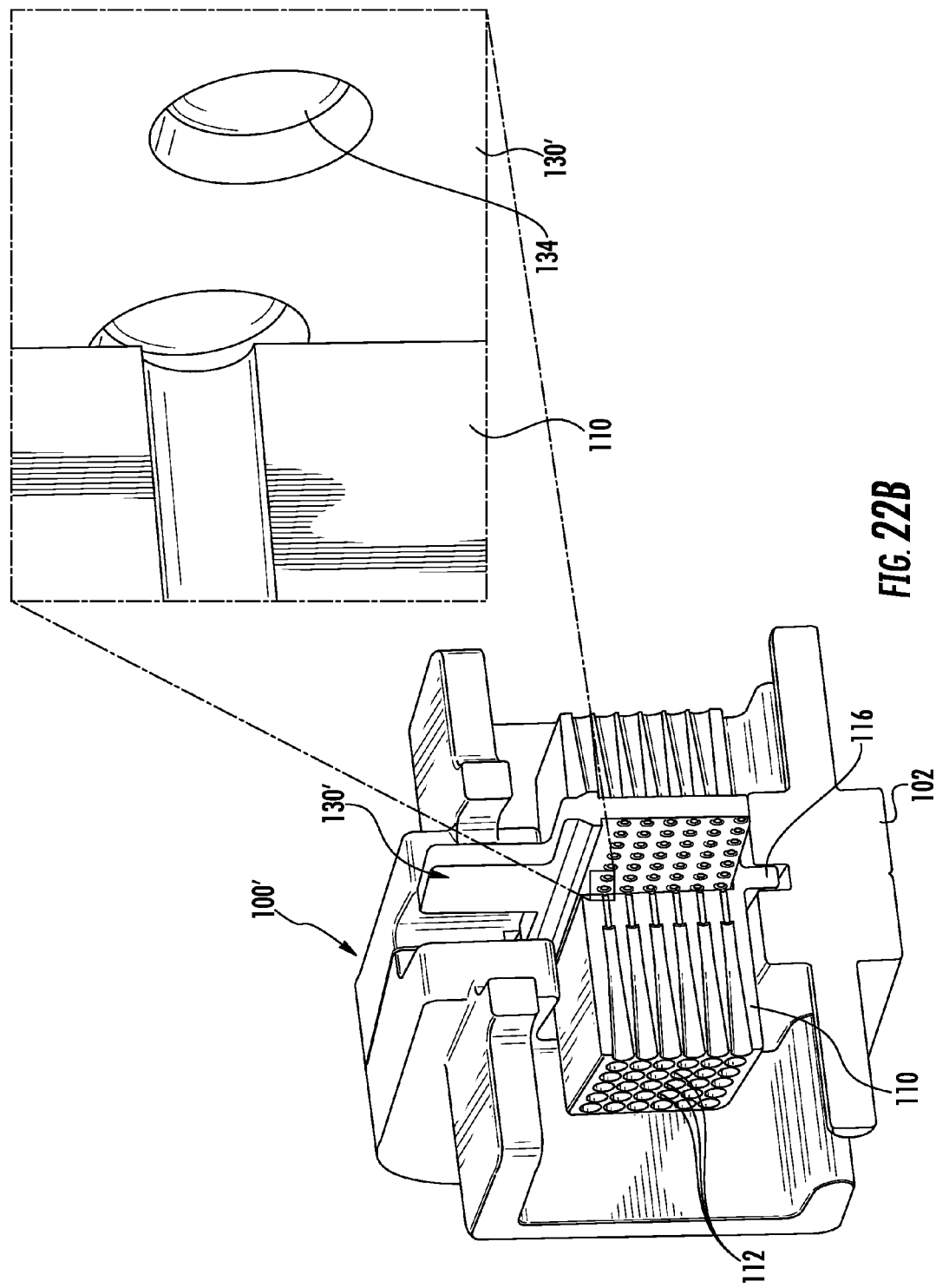

Other structures and methods are also possible for aligning the fibers for transmitting optical signals between the arrays of fibers inserted into the adapter. For instance, the adapter could include beam expanding lenses between the arrays of fibers. By way of example, the cap could be modified to include a plurality of beam expanding lens for transmitting signals between the optical fibers inserted from each end. FIGS. 22a-22c depict alternative adapters 100' similar to adapter 100, but use a lens element 130' as the transmission element within the cavity 114 instead of an index-matching material. In particular, FIGS. 22a-22c shows different lens elements 130' that respectively use a plurality of convex lenses 132, a plurality of concave lenses 134, and a plurality of graded refractive index (GRIN) lenses 136 for beam expansion. As with cap 130, the lens elements 130' are removable for allowing cleaning and/or replacement of the same. Embodiments using the GRIN lenses are advantageous since they may be used with an index matching material which allows the fibers to abut the GRIN lenses, whereas the concave or concave lenses are preferably dry (i.e., no index matching material) and the fiber are located at or near the focal point of the lens. Also the GRIN lenses may have a well for receiving the index-matching material if desired.

In these embodiments, adapters 100 and 100' include a splice guide 110 configured as an insert that fits into housing 102. Configuring splice guide 110 as an insert of adapter 100 or 100' is advantageous for manufacturing since the high-precision structure can be manufactured into the insert and not the entire assembly (i.e., the housing). Splice guide 110 includes a rib 116 that fits into a groove (not numbered) of housing 102 as shown for seating the same with respect to housing 102. Housing 102 also includes an opening 103 for receiving reservoir cap 130 or lens element 130' therethrough. To assemble the adapters, the splice guide 110 is inserted into housing 102 so that rib 116 is seated into the groove of housing 102. Thereafter, the reservoir cap 130 or lens element 130' can be inserted through the opening 103 of housing 102 so that is attaches to the opening 118 of cavity 114 of the splice guide 110. For the embodiments using an index-matching material, cavity 114 of splice guide 110 may be filled with an index-matching material at any suitable time such as before inserting the splice guide 110 into housing 102, before attaching the reservoir cap 130, or the reservoir cap 130 may be removed after assembly to fill cavity 114.

As best shown in FIG. 22, splice guide 110 has a plurality of bores (not numbered) that extend from a first end and a plurality of bores (not numbered) that extend from a second end. The plurality of bores disposed on the first and second ends of the splice guide 110 extend into a cavity 114. The bores include a fiber lead-in portion 112 for guiding each respective optical fiber to a precision opening (not numbered) adjacent to cavity 114. In other words, the lead-in portion 112 receives the respective optical fiber from the splicing connector and provides coarse alignment and guides the optical fiber to the precision opening. Consequently, mating optical fibers from each mating splicing connector inserted into adapter 100 are precisely aligned and abutted within the cavity 114 that has the index-matching material therein. In the case of adapters 100', the mating optical fibers from each mating splicing connector are inserted into adapter 100' are precisely aligned and adjacent and/or abutted to the respective lenses of lens cap 130'. When the splice connector is inserted into adapter 100 the optical fibers are received in respective lead-in portions 112 of the splice guide, then as the fiber guide of the splice connector abuts splice guide of the adapter 100, the fiber guide slides rearward relative to the optical fibers so they can be fully inserted into the splice guide 110. Moreover, the optical fibers may have a slight overlength for mating, thereby keeping the optical fibers abutted in physical contact with a small spring force and/or slight bend in the optical fibers to ensure good optical connectivity.

Figure 23:
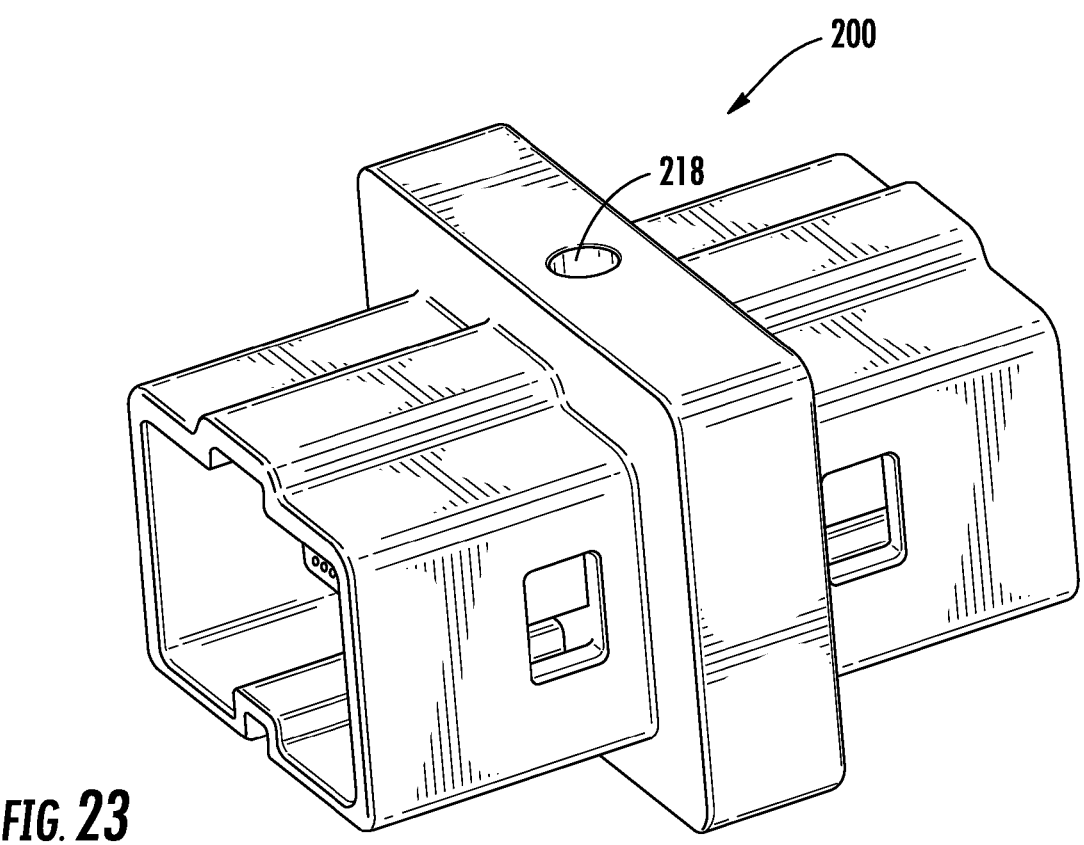
FIG. 23 is a perspective view of another adapter for mating fiber optic splicing connectors having a fiber guide for aligning and splicing optical fibers therein.
Figure 24:
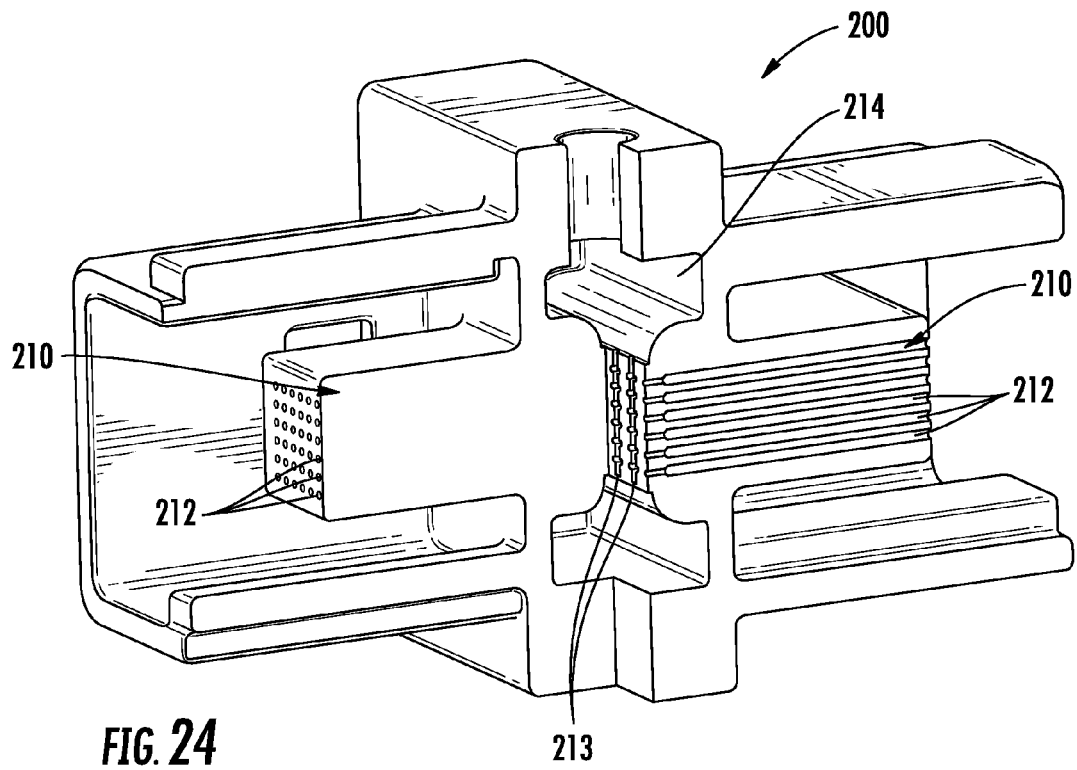
FIG. 24 is a cross-sectional view of the splicing connector of FIG. 23.
Figure 25:
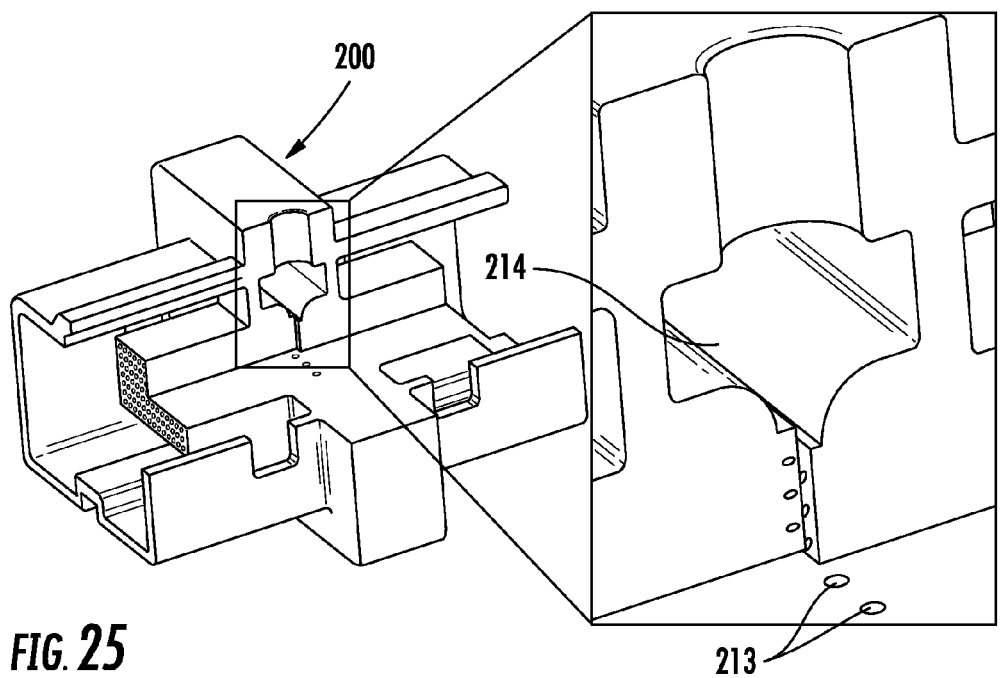
FIG. 25 is a partial sectional view of the splicing connector of FIG. 23 showing details of the gel reservoir entry.
Figure 26:
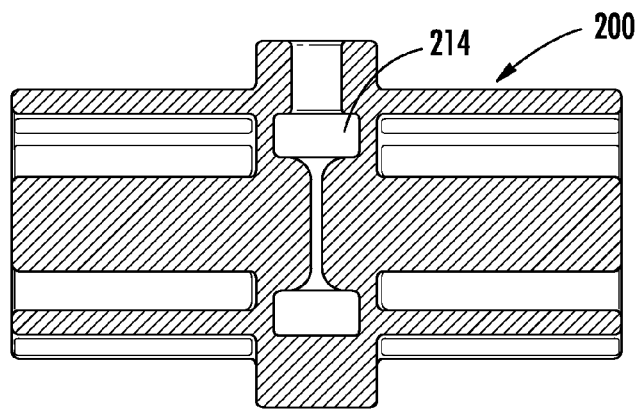
FIG. 26 is a schematic cross-sectional view of the splicing connector of FIG. 23 showing the profile of the gel reservoir.
Figure 27:
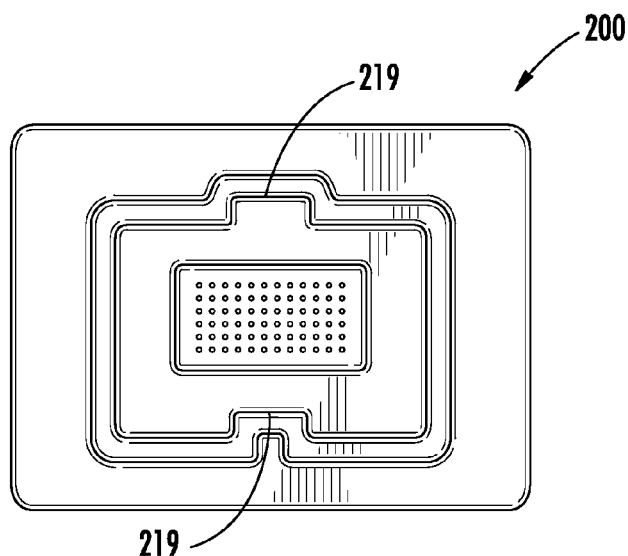
FIGS. 27 and 28 respectively depict an end view and a plan view of the splicing connector of FIG. 20.
Figure 28:
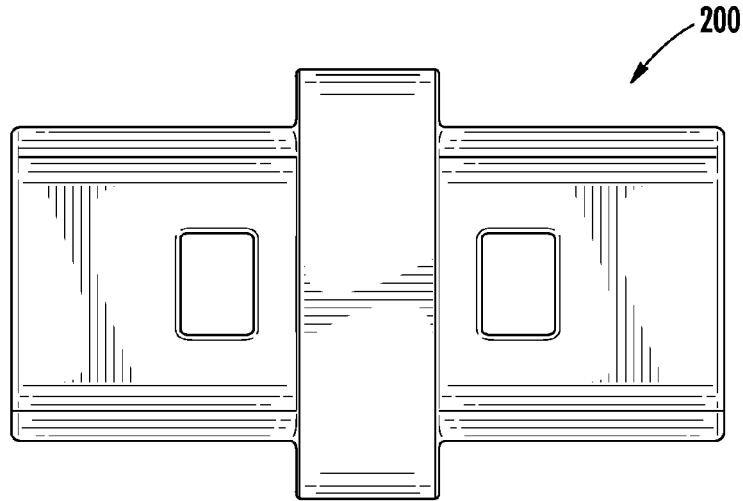

FIGS. 23 and 24 respectively are a perspective and cross-sectional view of another adapter 200 for mating splicing connectors, thereby making high-density optical connections. Adapter 200 is similar to adapter 100 in operation and other respects, but it has a fiber guides 210 that are integral with the housing, thereby eliminating the number of components. However, adapter 200 may be more difficult to manufacture since the high-precision portions are integrated with the housing (not numbered). Adapter 200 includes fiber guides 210 having a plurality of bores that respectively extend from a first end and a second end to a cavity 214. Cavity 214 is configured for receiving an index-matching material therein for improving the optical connection between abutting optical fibers. Additionally, cavity 214 has an opening 218 for filling the same with an index-matching material and which may be closed or sealed with a cap or other suitable structure (not shown). As best shown in FIGS. 24 and 25, the side of fiber guides 210 adjacent to cavity 214 includes a plurality of tunnels 213 for aiding manufacturing. FIG. 26 is a schematic cross-sectional view of adapter 200 showing the profile of the cavity 214. FIGS. 27 and 28 respectively depict an end view and a plan view of adapter 200 showing details like keying features 219 and the like.

Figure 29:
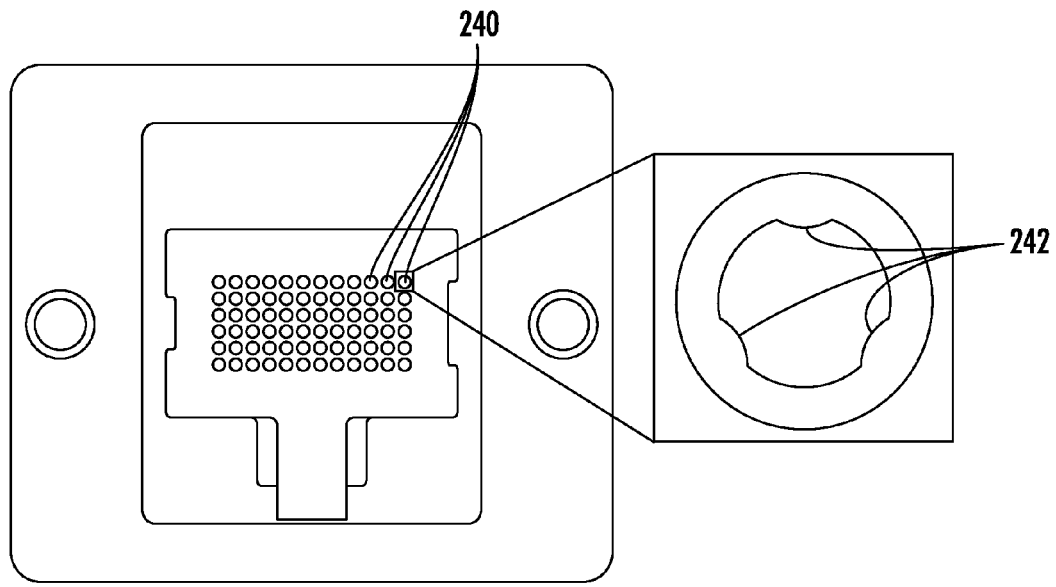
FIG. 29 shows an optional geometry for the fiber guide bores of the adapter.

FIG. 29 shows an optional geometry for the fiber guide of an adapter. Specifically, FIG. 29 shows the detail of a bore 240 of the fiber guide that includes a plurality of ribs 242. Ribs 242 act as a centering structure allowing alignment of the optical fibers within the bore by centering the optical fiber therein. Other configurations of ribs may use other shapes, positions, and/or other numbers for providing centering for the optical fibers.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present invention without departing from the spirit and scope of the same. Thus, it is intended that the present invention cover the modifications and variations of this invention provided they come within the scope of the appended claims and their equivalents.

We claim:

1. A method for laser processing a plurality of optical fibers comprising the steps of:
    providing a structure having a plurality of optical fibers arranged in a plurality of rows;
    inserting a protection element between a first row of optical fibers and a second row of optical fibers;
    laser processing the first row of optical fibers with laser energy; and
    shielding the second row of optical fibers from the laser energy during the laser processing step, wherein the step of shielding comprises:
        the protection element being positioned between the first row of optical fibers and the second row of optical fibers during the step of laser processing, and
        the laser energy impacting the protection element while the protection element is positioned between the first row of optical fibers and the second row of optical fibers during the step of laser processing.

2. The method of claim 1, further including the step of providing an absorption element adjacent to the first row of optical fibers.

3. The method of claim 1, further including the step of using the protection element to move the second row of optical fibers.

4. The method of claim 1, wherein the protection element is a reflection element.

5. The method of claim 1, wherein the protection element is an absorption element.

6. The method of claim 1, wherein the protection element is a dispersion element.

7. The method of claim 1, wherein the protection element has a first portion and a second portion.

8. The method of claim 1, further including the step of repositioning the protection element for laser processing the second row of optical fibers.

9. The method of claim 1, wherein the structure secures the optical fibers at a common location for inhibiting relative movement among the optical fibers in the plurality of rows.

10. The method of claim 1, wherein:
    the step of providing the structure is comprised of:
        removing a portion of a cable jacket within which the optical fibers are initially disposed, and
        inserting the optical fibers into the structure so that the optical fibers are arranged in the plurality of rows; and
    the method further comprises using the structure with a fiber optic connector.

11. The method of claim 1, further comprising creating space between the second row of optical fibers and the first row of optical fibers, wherein the creating of the space is comprised of pushing the second row of optical fibers away from the first row of optical fibers with the protection element.

12. The method of claim 7, further including the step of moving the first portion of the protection element relative to the second portion of the protection element.

13. The method of claim 7, wherein the protection element includes a hinge and a space therebetween.

14. The method of claim 7, further including the step of inserting one or more optical fibers into a space between the first portion and the second portion of the protection element.

15. The method of claim 11, further comprising using the protection element to maintain the space between the second row of optical fibers and the first row of optical fibers during the step of laser processing.

16. A method for laser processing a plurality of optical fibers comprising the steps of:
provide a structure having a plurality of optical fibers arranged in a plurality of rows;
presenting a first row of optical fibers for laser processing by a laser and shielding a second row of optical fibers from the laser, wherein:
the presenting of the first row of optical fibers and the shielding of the second row of optical fibers are comprised of inserting a protection element between the plurality of optical fibers, the protection element having a first portion and a second portion attached to the first portion by a hinge,
the inserting of the protection element is comprised of inserting the first row of optical fibers into a space between the first and second portions of the protection element,
the presenting of the first row of optical fibers and the shielding of the second row of optical fibers are further comprised of causing relative movement between the first row of optical fibers and the second row of optical fibers, and
the causing of the relative movement is comprised of causing relative pivoting between the first and second portions of the protection element, and the pivoting being about the hinge; and
laser processing the first row of optical fibers with the laser while the second row of optical fibers is shielded from the laser by the protection element.

17. The method of claim 16, further including the step of providing an absorption element adjacent to the first row of optical fibers.

18. The method of claim 16, wherein the protection element includes one or more of a reflection element, an absorption element and a dispersion element.

19. The method of claim 16, wherein the shielding of the second row of optical fibers is comprised of laser energy impacting the protection element during the step of laser processing.

20. The method of claim 16, wherein the structure secures the optical fibers at a common location for inhibiting relative movement among the optical fibers in the plurality of rows.

21. The method of claim 16, wherein:
the step of providing the structure is comprised of:
removing a portion of a cable jacket within which the optical fibers are initially disposed, and
inserting the optical fibers into the structure so that the optical fibers are arranged in the plurality of rows; and
the method further comprises using the structure with a fiber optic connector.

22. A method for laser processing a plurality of optical fibers comprising the steps of:
providing a structure having a plurality of optical fibers arranged in a plurality of rows;
inserting a protection element between the plurality of optical fibers so that a first row of optical fibers is presented for laser processing by a laser and a second row of optical fibers is shielded from the laser, the protection element having a first portion and a second portion attached to the first portion by a hinge, wherein the first row of optical fibers is inserted into a space between the first and second portions of the protection element when presented for laser processing;
laser processing the first row of optical fibers with the laser while the second row of optical fibers is shielded from the laser by the protection element;
moving the protection element outward from between the plurality of optical fibers;
repositioning the protection element to align the second row of optical fibers with the space between the first and second portions;
inserting the protection element between the plurality of optical fibers so that the second row of optical fibers is presented for laser processing by the laser and the first row of optical fibers is shielded from the laser; and
laser processing the second row of optical fibers with the laser while the first row of optical fibers is shielded from the laser by the protection element.

* * * * *

UNITED STATES PATENT AND TRADEMARK OFFICE
CERTIFICATE OF CORRECTION

| | | |
|---|---|---|
| PATENT NO. | : 9,268,091 B2 | Page 1 of 1 |
| APPLICATION NO. | : 13/028799 | |
| DATED | : February 23, 2016 | |
| INVENTOR(S) | : Michael de Jong et al. | |

It is certified that error appears in the above-identified patent and that said Letters Patent is hereby corrected as shown below:

Title Page

| *No.* | *Col.* | *Line* | *Description* |
|---|---|---|---|
| 1 | Left | 2 | (12) Name is incorrect. Name should be displayed as de Jong. |

Signed and Sealed this
Seventh Day of June, 2016

Michelle K. Lee
*Director of the United States Patent and Trademark Office*